United States Patent
Simmons et al.

(10) Patent No.: US 6,556,754 B2
(45) Date of Patent: Apr. 29, 2003

(54) THREE DIMENSIONAL OPTICAL CIRCUIT

(75) Inventors: Richard L. Simmons, Leander, TX (US); Curtis L. Shoemaker, Round Rock, TX (US); Kenneth L. Kornele, Georgetown, TX (US); Harry A. Loder, Austin, TX (US); Edward B. Lurie, Round Rock, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/927,655

(22) Filed: Aug. 10, 2001

(65) Prior Publication Data

US 2003/0031436 A1 Feb. 13, 2003

(51) Int. Cl.$^7$ .................................................. G02B 6/04
(52) U.S. Cl. ........................ 385/121; 385/115; 385/116; 385/114
(58) Field of Search .................................. 385/114, 115, 385/116, 120, 121, 134, 135, 137, 147

(56) References Cited

U.S. PATENT DOCUMENTS

| | | | |
|---|---|---|---|
| 4,653,845 A | 3/1987 | Tremblay et al. | 385/46 |
| 4,902,092 A | 2/1990 | Grandy | 385/56 |
| 4,923,275 A * | 5/1990 | Kaukeinen | 385/53 |
| 5,009,475 A * | 4/1991 | Knudson | 385/116 |
| 5,134,673 A | 7/1992 | Stephenson et al. | 385/56 |
| 5,155,785 A | 10/1992 | Holland et al. | 385/89 |
| 5,204,925 A | 4/1993 | Bonanni et al. | 385/89 |
| 5,222,179 A | 6/1993 | Auteri | 385/114 |
| 5,239,609 A | 8/1993 | Auteri | 385/136 |
| 5,367,595 A | 11/1994 | Jennings et al. | 385/71 |
| 5,381,501 A | 1/1995 | Cardinal et al. | 385/54 |
| 5,394,502 A | 2/1995 | Caron | 385/134 |
| 5,537,501 A | 7/1996 | Iwano et al. | 385/58 |
| 5,715,345 A * | 2/1998 | McKinley | 385/115 |
| 5,732,173 A | 3/1998 | Bylander et al. | 385/49 |
| 5,734,777 A | 3/1998 | Merriken et al. | 385/135 |
| 5,774,617 A | 6/1998 | Stockman et al. | 385/134 |
| 5,832,150 A * | 11/1998 | Flint | 385/31 |
| 5,926,598 A | 7/1999 | Klein | 385/137 |
| 5,937,133 A | 8/1999 | Moss et al. | 385/137 |
| 6,005,991 A | 12/1999 | Knasel | 385/14 |
| 6,034,821 A | 3/2000 | Schenfeld et al. | 359/618 |
| 6,088,493 A | 7/2000 | Brenner | 385/17 |

(List continued on next page.)

FOREIGN PATENT DOCUMENTS

| | | | |
|---|---|---|---|
| EP | 1 180 708 A2 | 2/2002 | G02B/6/44 |
| JP | 63-138306 | 6/1988 | G02B/6/24 |
| JP | 63-286807 | 11/1988 | G02B/6/38 |
| JP | 11-258448 | 9/1999 | G02B/6/24 |
| WO | WO 99/45719 A1 | 9/1999 | G02B/26/02 |
| WO | WO 00/00344 | 1/2000 | B29C/67/00 |
| WO | WO 00/33117 | 6/2000 | G02B/6/38 |

*Primary Examiner*—Brian Healy
*Assistant Examiner*—Kevin S Wood
(74) *Attorney, Agent, or Firm*—Yen Tong Florczak

(57) ABSTRACT

A three dimensional optical circuit featuring an optical manifold for organizing, guiding and protecting individual optical fibers is shown. One aspect of the present invention is a three dimensional manifold which may be constructed using a rapid prototyping process such as, but not limited to, stereolithography ("SLA"), fused deposition modeling ("FDM"), selective laser sintering ("SLS"), and the like. The manifold has a number of input openings in a first ordered arrangement at one end connected by passageways to a number of output openings in a second ordered arrangement at the opposite end. A plurality of optical fibers may be directed through the passageways of the manifold to produce a three dimensional optical circuit such as a shuffle. Moreover, the optical manifold may be used in conjunction with a number of connections or terminations to form a various optical modules. These modules may be configured for rack mounting within enclosures for electrical components.

15 Claims, 20 Drawing Sheets

U.S. PATENT DOCUMENTS

| | | |
|---|---|---|
| 6,148,134 A | 11/2000 | Schoon ........................ 385/137 |
| 6,151,437 A | 11/2000 | Cherbettchian et al. ...... 385/136 |
| 6,185,348 B1 | 2/2001 | Shahid ........................ 385/149 |
| 6,222,976 B1 | 4/2001 | Shahid ........................ 385/134 |
| 6,304,784 B1 | 10/2001 | Allee et al. .................. 607/116 |
| 6,351,590 B1 | 2/2002 | Shahid ........................ 385/134 |
| 6,421,493 B1 * | 7/2002 | Burek ......................... 385/134 |
| 6,464,404 B1 | 10/2002 | Robinson et al. .............. 385/54 |

* cited by examiner

THREE DIMENSIONAL OPTICAL CIRCUIT

BACKGROUND OF THE INVENTION

1. Field of the Invention

The present invention relates generally to three dimensional optical circuits and, more particularly, to a three dimensional optical circuit assembly comprising an optical manifold and a method for making the same.

2. Background of the Invention

Optical fiber networks are becoming increasingly common in modem telecommunications systems, high speed routers, computer systems and other systems for managing large volumes of data. Optical fiber networks typically comprise a large number of optical fibers which are routed over relatively long distances in order to increase transmission speeds and efficiencies relative to the propagation of conventional electrical signals. There is often the need to route individual optical fibers between various connection points throughout a system creating an "optical circuit". One of the more common optical circuits in use today is referred to as an "optical shuffle". By way of example only, a simple optical shuffle may be carried out using eight optical fiber cables each having eight individual optical fibers enclosed therein. In what may be referred to as a "perfect shuffle", using the fibers of our example here, fiber 1 of each of the eight cables coming in may be routed to a single first cable going out, and the second fiber of each of the eight cables coming in may be routed to a single second cable going out, and so forth. Referring now to FIG. 1, this particular optical shuffle is represented in a simplified schematic in which $C_m$ refers to the input ribbon or cable, $C_m F_n$ refers to the individual fibers $F_n$ which originate in cable $C_m$, and $C_m'$ is the output ribbon or cable following the optical shuffle. It is to be understood, that although this particular example featured only 64 optical fibers, optical circuits often involve a far larger number of fibers which must be routed. Therefore, creating optical shuffles and other optical circuit structures by hand can be a tedious and highly error prone process. One can easily envision the nest of tangled optical fibers occurring in circuits between the input cables and the output cables.

Several solutions have been proposed for the creation of various optical circuits rather than simply trying to route fibers from input points to output points by hand through a large tangle of other fibers. One such solution is the use of semiautomatic machines which weave the individual fibers into the needed circuit arrangement. This solution often requires a significant financial investment in machines which are of little or no use in applications other than the weaving of optical fibers.

Another solution to the problem of creating optical circuits includes a number of attempts to route optical fibers on a flexible polymer substrate. By way of example only, one popular form of this construct is marketed as a Flex Foil®. One such approach to a flexible optical circuit solution is set forth and described in U.S. Pat. No. 5,204,925 issued to Bonanni et al. This reference describes a solution in which a flexible polymer substrate such as Mylar® or Kapton® may be coated with a pressure sensitive adhesive (PSA) and have optical fibers mounted thereon. After a number of optical fibers are laid on the substrate in the proper arrangement, a protective cover layer, usually of the same type of material as the substrate, can be bonded on top of the fibers. Of course, the exposed surface of this cover layer may subsequently be coated with an adhesive itself and additional layers of optical fibers and cover materials may be built up in the form of a laminate structure. However, the fiber lay-up process is quite labor intensive and, much like fiber weaving, would require highly specialized equipment to automate. Bonanni et al. further discloses the use of flexible side tabs or thinner strips of substrate material which extend laterally from the main body where the shuffle has occurred, and permit the optical fibers to be bent or rotated at, for example, a 90° angle to reorient the fibers from a horizontal position to a vertical position.

Another approach which incorporates a flexible optical circuit is set forth in U.S. Pat. No. 6,005,991 issued to Knasel. This particular reference discloses a printed circuit board (PCB) assembly that includes an interior portion upon which a flexible optical circuit is mounted. Much like the Bonanni et al. reference, Knasel arranges a plurality of optical fibers which are sandwiched between flexible sheets. These flexible sheets are commonly formed of Mylar® or the like and hold the optical fibers in place and are subsequently bonded to other flexible sheets using pressure sensitive adhesives, as known in the art. In this reference, space is conserved along the edge of a printed circuit board by attaching a multifiber connector to the respective first ends of the optical fibers and using single fiber connectors at the second ends of the optical fibers where space is more readily available, such as the less populated interior portion of the printed circuit board.

It should also be noted that both of these flexible circuit approaches are generally implemented in the form of large sheets with prerouted fiber networks or printed circuit boards with flexible optical circuit portions mounted thereon. In either case, these circuits normally have splices at both the input and output ends of the optical circuit to facilitate attachment to the input fiber cables and the output fiber cables during installation. Splices are normally required to overcome the length limitations of the tabs extending from the body of the flexible circuit. Additionally, splices may be used to attach specialized connectors to the input and output ends of the circuit for coupling to ruggedized cables. The splices at both the input and output end of the shuffle or optical circuit produce optical signal losses which when added across an entire optical network may be significant and unacceptable to the user. Furthermore, both mechanical and fusion splices commonly require considerable amounts of space because of the need to mechanically reinforce or strengthen the splice. Additionally, the flexible optical circuit approaches described here generally do not permit the use of protectively sheathed or "ruggedized" fiber optic ribbons leading all the way up to the flexible circuit, nor do they offer much protection to the optical fibers within the circuit or shuffle beyond the meager protection provided by a single layer of polymer film. Moreover, flexible optical circuit designs do not isolate and protect the individual fibers in that, at crossing points within the circuit, many of these fibers are in direct contact with each other.

Therefore, there is a need for three dimensional optical circuits which can be created without the expense of weaving machines and which can be more readily routed into a number of different shuffle arrangements. There is a need for an optical circuit arrangement which is less labor intensive than building up a multilayer laminate structure of Mylar® film, pressure sensitive adhesive and optical fiber, several strands of optical fiber at a time. There is also a need for an optical circuit which allows ruggedized ribbons of fiber optic cable to be run up to the circuit and away from the circuit and which provides a ruggedized protected environment for the optical fibers during the shuffle itself. There is a need for a three dimensional optical circuit having fewer fiber splices and reduced optical signal loss. Additionally, there is a need for a three dimensional optical circuit which fits into environments with limited surface area (x-y axes) by more efficiently stacking the shuffle to fully utilize space in a vertical direction (z-axis).

SUMMARY OF THE INVENTION

The three dimensional optical fiber circuit apparatus and method described herein below will address each of these aforementioned needs and provide a number of additional benefits as well. In one embodiment, the present invention is a rigid, unitary, three dimensional manifold constructed using a rapid prototyping process such as, but not limited to, stereolithography ("SLA"), fused deposition modeling ("FDM"), selective laser sintering ("SLS"), and the like. Note that the terms rapid prototyping and rapid manufacturing are interchangeable in regard to the present invention in that this technology may be utilized not only for creating prototypes, but actual manufacturing as well.

Although the equipment for carrying out SLA processes and other rapid prototyping techniques are relatively expensive machines, these systems are general purpose and are readily available. SLA machines and other rapid prototyping machines are readily programmable to create virtually any three dimensional object which can be designed on a computer aided design ("CAD") system. Accordingly, the design of a three dimensional manifold for routing a large number of optical fibers may be laid out in any number of configurations or arrangements limited only to the capabilities of the CAD system or the imagination of the designer. Moreover, it is possible to program these systems to create passageways or channels for routing optical fibers to provide for an appropriate bend radius and thereby minimize optical signal loss, and to isolate and protect the individual fibers throughout the optical circuit. Further, it is possible to create optical circuits that could not be readily manufactured using conventional molding or forming techniques.

The fiber optic manifold, in accordance with the present invention, may take any number of possible embodiments, including a solid block having a number of hollow passageways connecting input points and output points or a large plurality of rigid hollow tubes which again have a number of input points and output points. By way of example only, these input openings may be arranged in a matrix having an equal number of rows and columns. In the case of 8 fiber optic cables each having 8 fibers, this would require an optical manifold having 64 input openings, 64 output openings, and 64 passageways connecting therebetween. If the input and output ends of the manifold are properly labeled, it should be relatively easy for a user to determine which optical fiber is to be inserted into the appropriate opening and will be exit from the appropriate opening on the opposite end of the manifold. Moreover, since there is only one passageway connecting a particular input with a particular output there is no need to worry about fibers becoming entangled within each other or causing confusion for the person guiding them through the manifold.

In yet another embodiment, the present invention is a process for forming a three dimensional optical circuit including the steps of providing a rigid, unitary optical manifold having an input end and an output end; arranging a plurality of optical fiber cables leading up to the input end of the manifold, and arranging a plurality of optical fiber cables leading away from the output end of the manifold; splitting out the individual fibers of each input cable and guiding each fiber to an individual input opening of the manifold, collecting up the individual fibers extending from the output openings of the optical manifold and gathering them back up into optical cable bundles. Generally, it is possible to merely strip and separate the optical fibers from the input cables and feed them into the input openings of the manifold, passing them through the manifold and then terminating the resulting cable groups at the output side only and have no fiber splices within the shuffle itself. Thus, it is not unreasonable to completely eliminate optical signal losses incurred by splices within individual optical circuits, including shuffles. This reduction in optical signal losses could be quite significant if multiplied throughout an entire optical network.

BRIEF DESCRIPTION OF THE DRAWINGS

A more complete understanding of the method and apparatus of the present invention may be obtained by reference to the following Detailed Description when taken in conjunction with the accompanying drawings in which like reference numerals refer to like parts and wherein.

DETAILED DESCRIPTION OF THE PREFERRED EMBODIMENTS

Referring now to the Figures, and in particular to FIGS. 2–6, there is disclosed a number of embodiments or variations constructed in accordance with the present invention for providing an optical manifold which may be incorporated into a three dimensional optical circuit such as a shuffle. As used herein, the term "optical manifold" shall refer to a component of a three dimensional optical circuit which provides a number of passageways for connecting a set of input openings to a set of output openings and for receiving a plurality of optical fibers in a first ordered arrangement at the input and outputting the plurality of fibers in a second ordered arrangement at the exit. As used in regard to the openings of an optical manifold, the term "ordered arrangement" refers not to the actual spatial relationship or location of one hole relative to another, but rather to the relationship of an input opening to an output opening.

Figure 1:
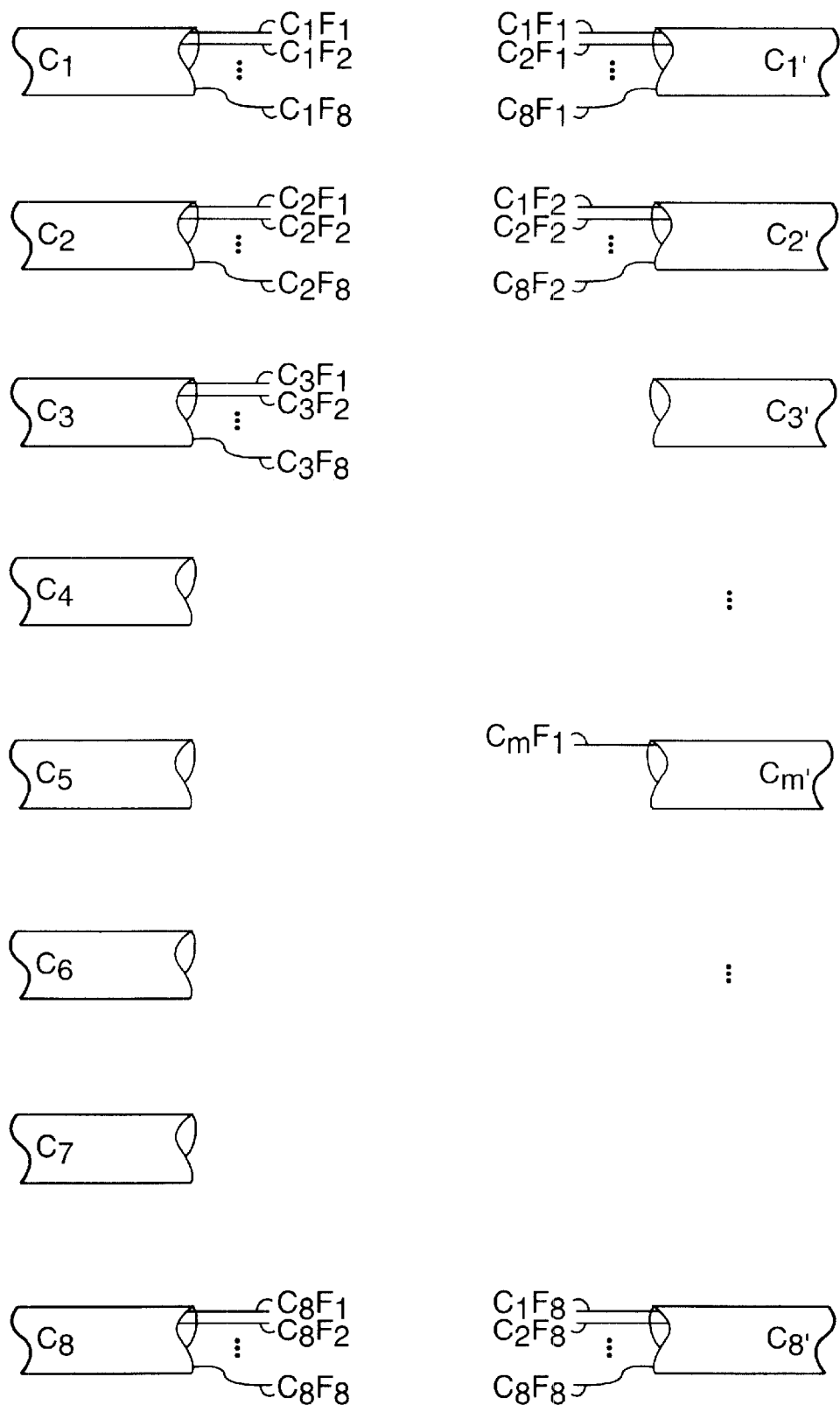
FIG. 1 is a simplified schematic representation of a number cables and fibers in a perfect 8×8 optical shuffle.

By way of example only, an optical manifold for carrying out a perfect shuffle, as described in regard to FIG. 1, may have a first ordered relationship in which the holes of row 1 correspond to fibers 1–8 of cable 1, the holes of row 2 correspond to fibers 1–8 of cable 2, and so forth. For this particular shuffle, the holes at the output end of the manifold may have a second ordered relationship in which the holes in row 1 correspond to fiber 1 of cables 1–8, the holes of row 2 correspond to fiber 2 of cables 1–8, and so forth. Thus, even though the holes at both ends of the manifold are disposed in an 8×8 array the ordered relationship of one hole to another at the input may be quite different from the ordered relationship at the output. In other words, by merely shifting the positions, relative to each other, of at least two fibers passing through an optical manifold, the ordered relationship of holes at the input end and output end of the manifold must be different.

Individual optical fibers may be split out of optical cables, guided through the optical manifold, and subsequently interfaced with another optical fiber, an optical connector, an optical waveguide or nearly any other optical device. It should be further noted that, although each of the examples shown and described herein involve the use of 8 optical cables, each containing 8 optical fibers, for a total of 64 individual optical fibers, these optical circuits may involve larger or smaller numbers of cables and fibers limited only by the imagination of the designer, the limitations of the CAD system and the physical limitations of the stereolithography or other rapid prototyping machines. Of course, fibers are most commonly bundled in multiples of 4 to produce cables having, for example, 8, 12, 16 or 24 fibers each. It should also be noted that, although in the examples shown herein the optical fiber manifolds are constructed of various UV curable photopolymers, as known in the art, it is also possible to utilize rapid prototyping techniques with various ceramic and metal compounds as well.

A fairly common optical circuit is that of a perfect shuffle which is carried out by inputting the individual fibers corresponding to row 1, columns 1–8 and routing them to column 1, rows 1–8, inputting the optical fibers of row 2, columns 1–8 and routing them to column 2, rows 1–8 and so forth. Of course, as will be illustrated in FIGS. 7–11, it is also possible to also arrange the fibers using an imperfect shuffle arrangement in which the fibers of row N are each advanced by N–1 number of columns from the input to the output end of the manifold. For example, in row 1 the fiber corresponding to column 1 at the input will exit at column 1. The fiber corresponding to column 2 at the input will exit at column 2 and so forth, with the fiber at input column 8 exiting at output column 8. In row 2, the fiber at input column 1 will exit at output column 2, the fiber at input column 2 will exit at column 3, and so forth with the fiber from input column 8 exiting at output column 1. Again, it is to be understood that these imperfect shuffles may be arranged in any number of ways (e.g., N+1, N–2, or the like), limited only by the CAD systems and rapid prototyping machinery used. One preferred form of rapid prototyping discussed herein is stereolithography, and although this is not the primary focus of the present invention, it is worth noting in some detail how a part is generally produced using stereolithography techniques.

Rapid prototyping is the name given to a host of related technologies that are commonly used to fabricate three dimensional physical objects directly from CAD data sources. These methods are generally similar to each other in that they normally create a three dimensional object by building up materials in a layer-wise fashion. Rapid prototyping is also referred to by the name of free form fabrication ("FFF"), layered manufacturing, automated fabrication and other variations of these terms. Stereolithography ("SLA") is the most commonly used rapid prototyping technology. This technique creates three dimensional plastic parts or objects one layer at a time by tracing or rasterizing a laser beam on the surface of a liquid photopolymer. This specialized class of polymer materials quickly solidifies wherever the laser beam strikes the surface of the liquid. Once one layer of the object is completely traced, the object is lowered one layer thickness on a stage into a container filled with photopolymeric material and a second layer is then traced by the laser right on top of the first. The photopolymer is self-adhesive in nature and the layers tend to bond one to another as they are built up to form a three dimensional object. Following the creation of the three dimensional part, it may be removed from the stereolithography apparatus and placed in an ultraviolet ("UV") post-curing, oven-like apparatus for a more complete cure and added dimensional stability.

The technique of selective laser sintering is somewhat similar to stereolithography in that the object is built up one layer at a time using a laser tracing a pattern on the surface. However, the polymer or other material is usually in powder form and is heated and fused together by the laser which melts the powder where it strikes under the guidance of a scanning system. Regardless of the rapid prototyping technique used, following curing, the resulting three dimensional object is a single, unitary and integral part and requires little, if any, further machining to produce a finished product. In the case of the various embodiments of the present invention, these three dimensional parts may be referred to as optical manifolds and may be laid out in any number of geometries or arrangements but will feature a number of hollow passageways, tubes or channels for routing individual optical fibers each from a single input opening to a single output opening of the manifold. The manifold has the additional benefit of being quite rigid and tough enough to protect the optical fibers from various environmental conditions and hazards that may be encountered.

Figure 2:
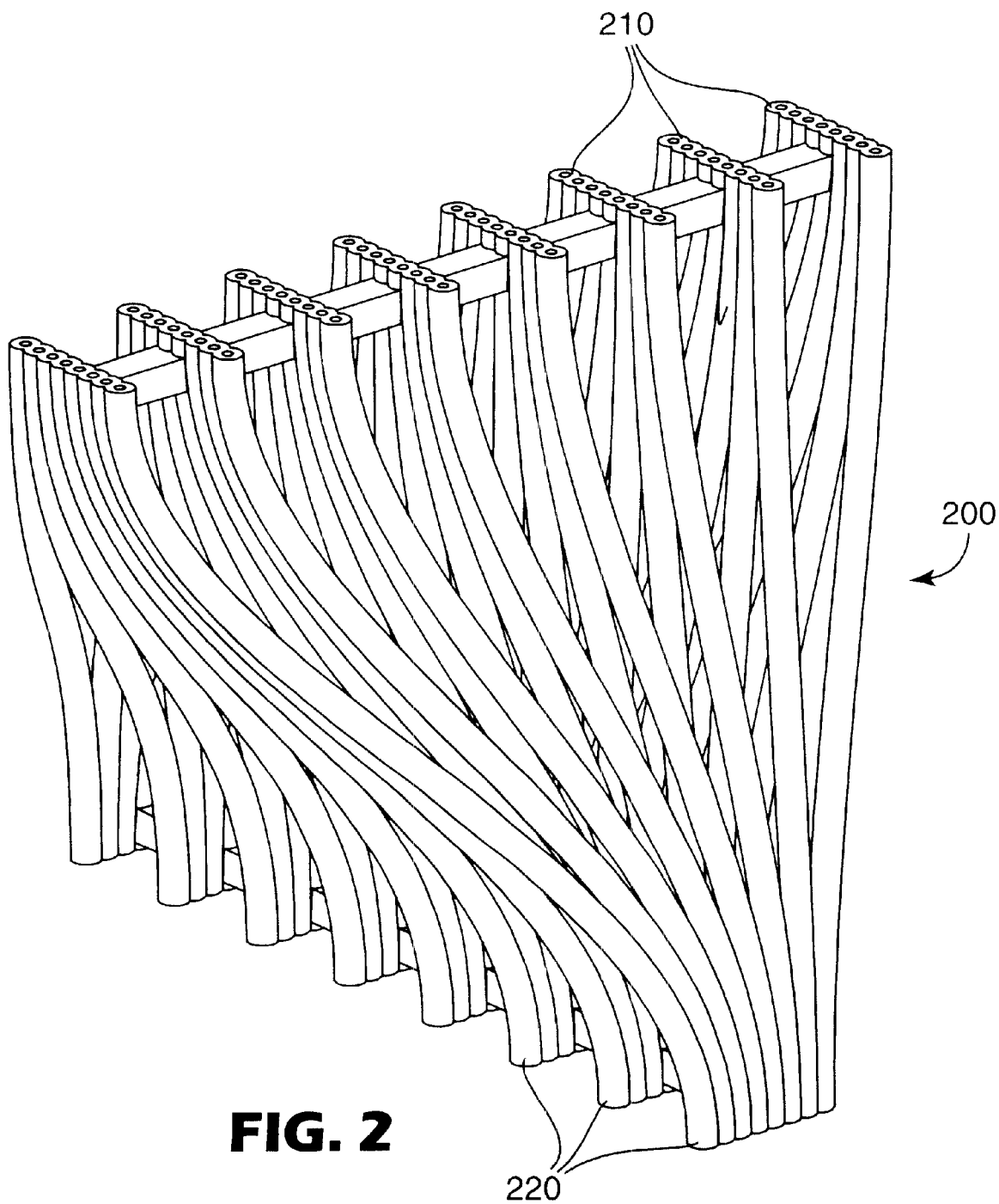
FIG. 2 is a perspective view of an optical manifold constructed in accordance with one embodiment of the present invention and featuring cross bracing members to ensure proper spacing and structural rigidity between the various rows and columns of the input ends and output ends of the optical manifold.

Referring now to FIG. 2, a perspective view of a stacked eight by eight shuffle manifold 200 is shown. As shown here, the input openings 210 and the output openings 220 are arranged in an 8×8 matrix with each of the columns of the input end and rows of the output end arranged in a stacked configuration with support members 230 disposed therebetween. The support members 230 serve to ensure proper spacing of the columns and rows, and also to provide additional strength and rigidity to the finished part. When filled with optical fibers, not shown, this particular embodiment produces a perfect shuffle in that the individual fibers of row 1 from columns 1–8 are brought together in column 1, rows 1–8 of the output end. The fibers of input row 2, columns 1–8 are shuffled to be arranged in column 2, rows 1–8 of the output end and so forth, with the fibers of row 8, columns 1–8 being shuffled into column 8, rows 1–8 of the output end of the manifold. It is to be noted that the CAD system has been programmed to ensure that none of the individual fibers are forced to experience a bend tighter than the critical bend radius, thereby minimizing optical signal loss and maximizing mechanical life span for each of the fibers passing through the optical manifold.

Figure 3:
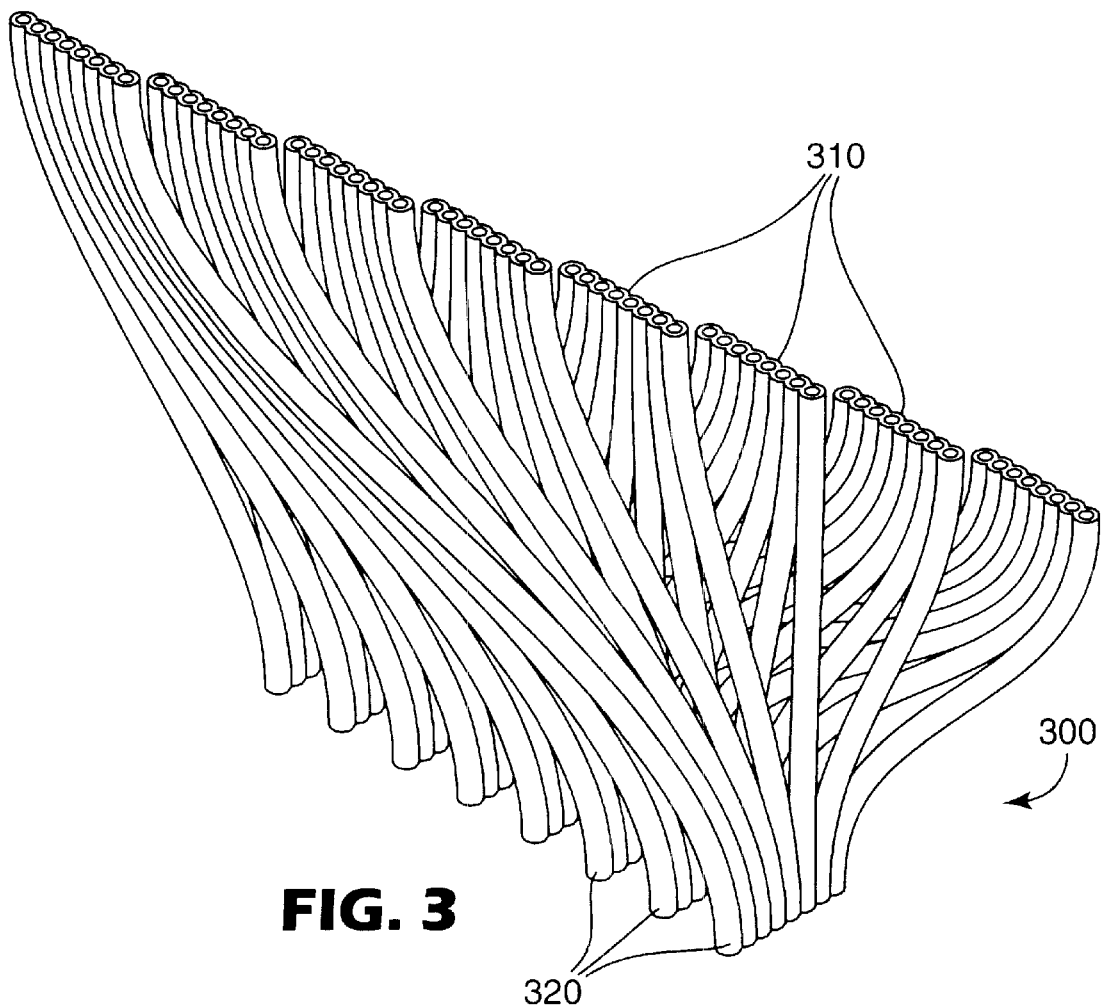
FIG. 3 is a perspective view of an optical manifold constructed in accordance with another embodiment of the present invention featuring staggered side-by-side inputs and stacked outputs.

Referring now to FIG. 3, another embodiment of an optical manifold 300 constructed in accordance with the present invention is shown. In this particular design, the input openings 310 and the output openings 320 of the manifold 300 are again stacked one on top of the other or side-by-side with each other, but the support members disposed therebetween have been removed. Additionally, at the input end of the manifold 300 columns 1–8 have been staggered side-by-side to provide additional spacing between each set of input openings 310.

Figure 4:
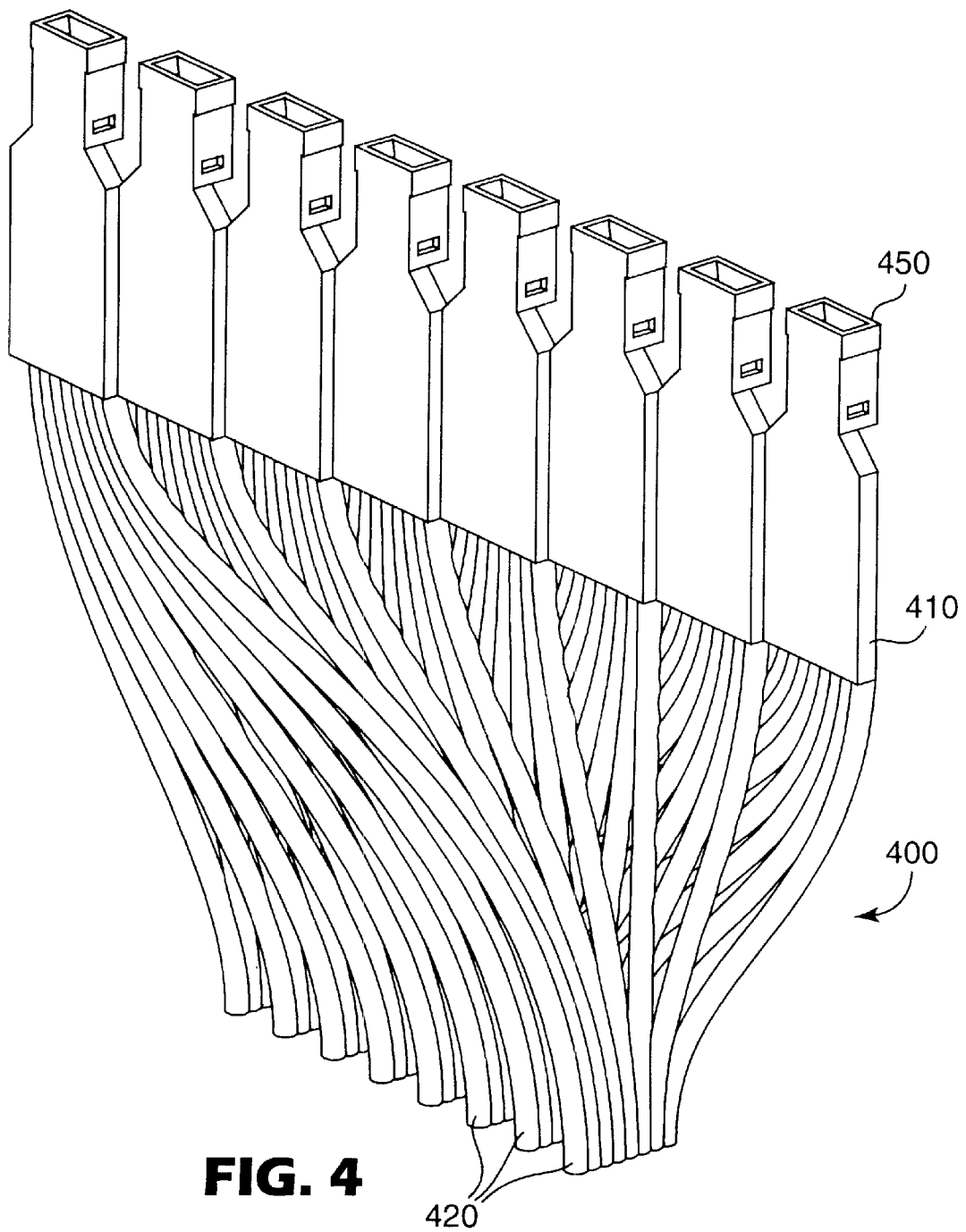
FIG. 4 is a perspective view of the optical manifold in accordance with the embodiment of FIG. 3 featuring ruggedized cable attachments for receiving ruggedized cables at one end of the manifold.

Referring now to FIG. 4, a manifold 400 constructed in accordance with the embodiment illustrated in FIG. 3 has been modified by the addition of a number of ruggedized cable attachments 450, leading to the input openings 410 of the manifold 400. This manifold 400 is suitable for receiving up to eight ruggedized fiber optic cables, not shown. Each of these cables will have a snap-fit member that may be coupled to the cable attachments 450 and then subsequently routed through the optical manifold 400. The term "ruggedized" cable generally refers to a type of optical cable with a tough polymer exterior which may be further reinforced by the use of Kevlar® or other internal tension-bearing members. Cables such as these provide the optical fibers with a great deal of physical and mechanical protection from harsh external environments.

Figure 5:
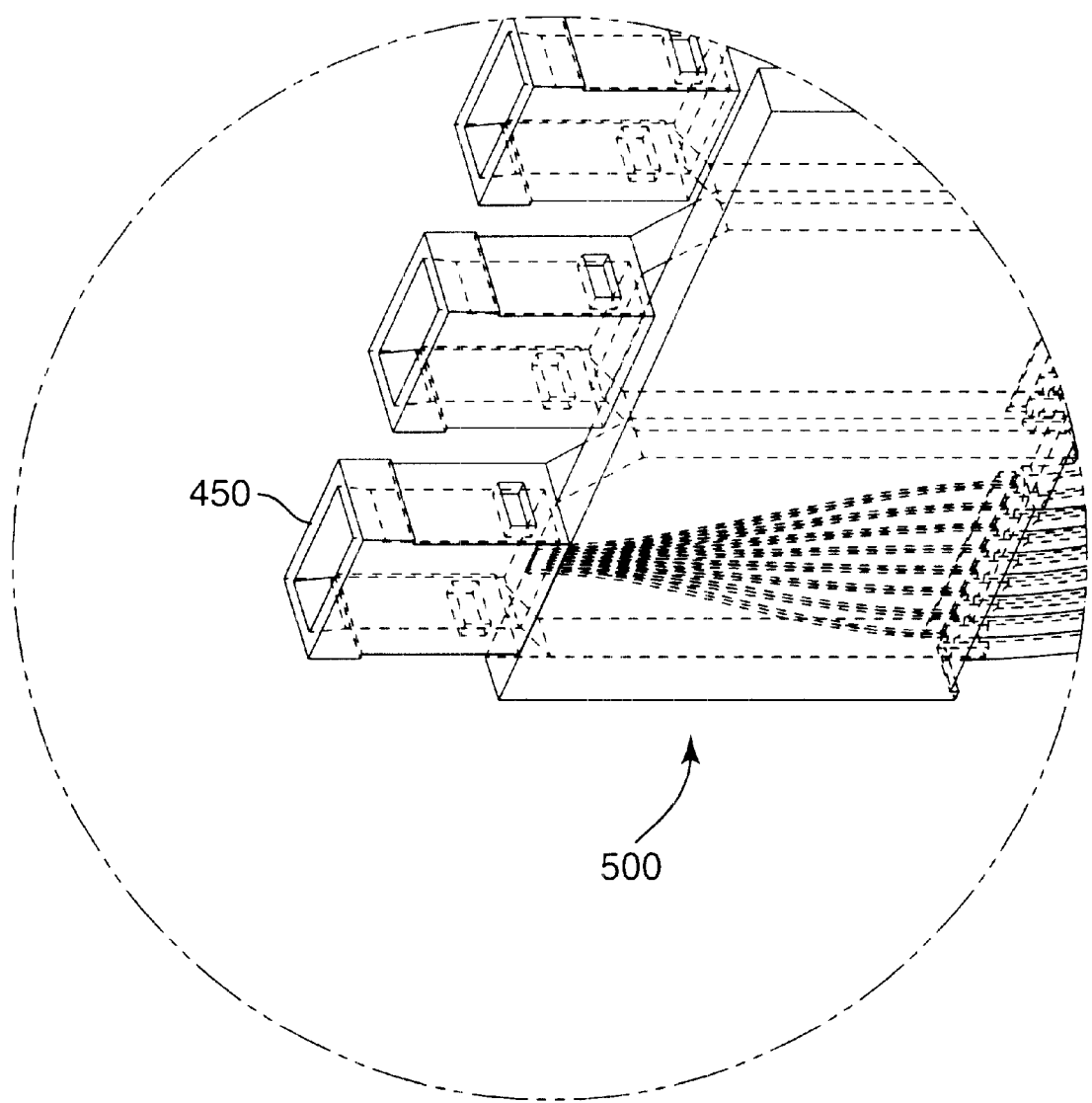
FIG. 5 is a detailed perspective view showing the interior structure of a pitch tool aligned with the optical manifold of FIG. 4.

Referring now to FIG. 5, a detailed illustration of a multifiber pitch tool 500 is shown. This tool is designed to receive fibers 100 having ribbon spacing or ribbon pitch and to split out or spread the individual fibers of each cable before entering the optical manifold 400. The multifiber pitch tool 500 ensures the proper spacing and alignment of the fibers with the input openings of the manifold 410.

Figure 6:
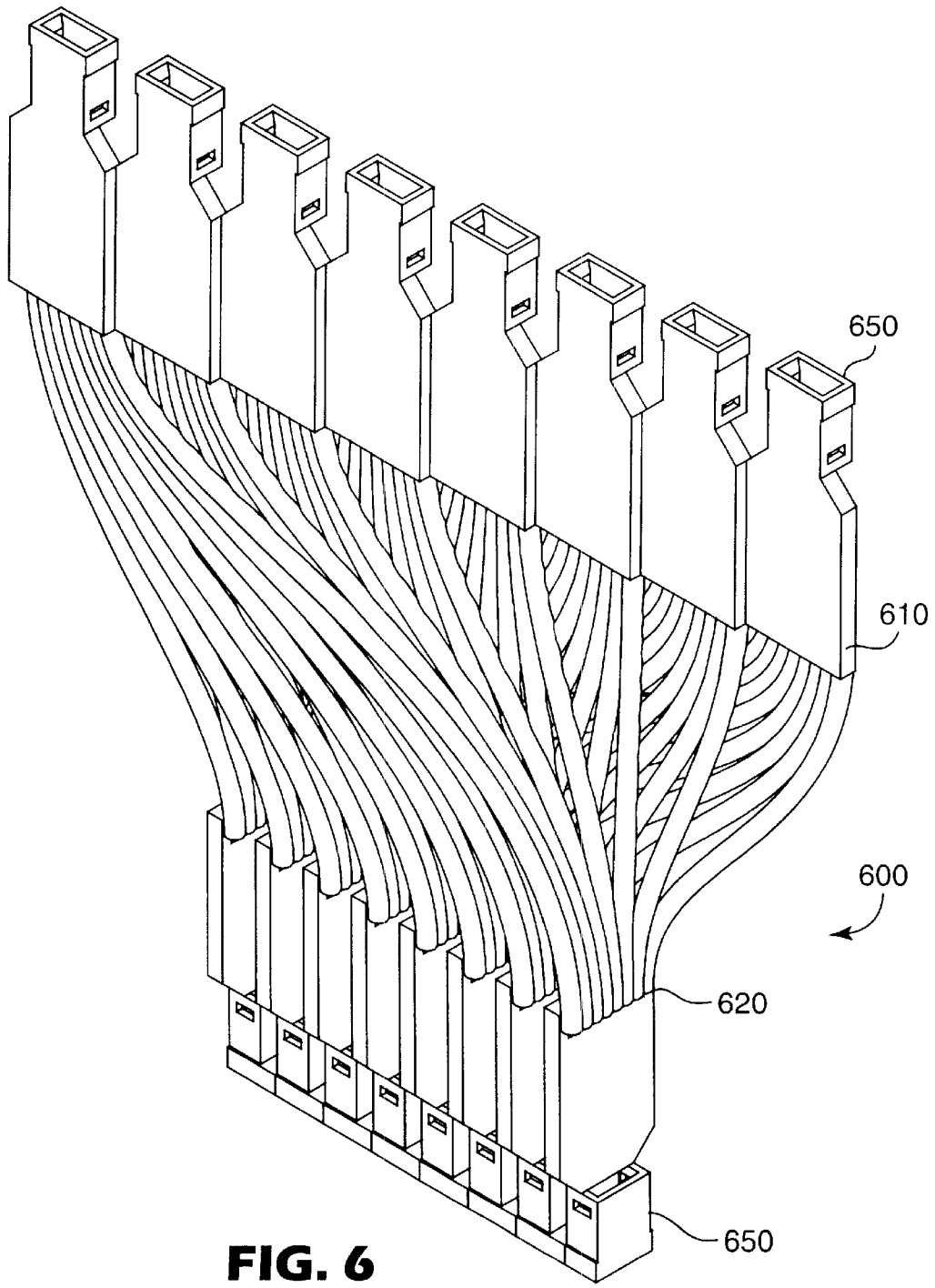
FIG. 6 is a perspective view of the optical manifold in accordance with the embodiment of FIG. 3, featuring ruggedized cable attachments at both the input and output ends of the optical manifold.

Of course, it is also possible to use this same form of ruggedized cable attachments at the output openings of the manifold to gather individual fibers into cable bundles, as shown in FIG. 6. Referring now to FIG. 6, yet another variation of the embodiment shown in FIG. 3 is illustrated. In this particular optical manifold 600, ruggedized cable attachments 650 have been provided at both the input 610 and output 620 ends of the manifold 600.

Figure 7:
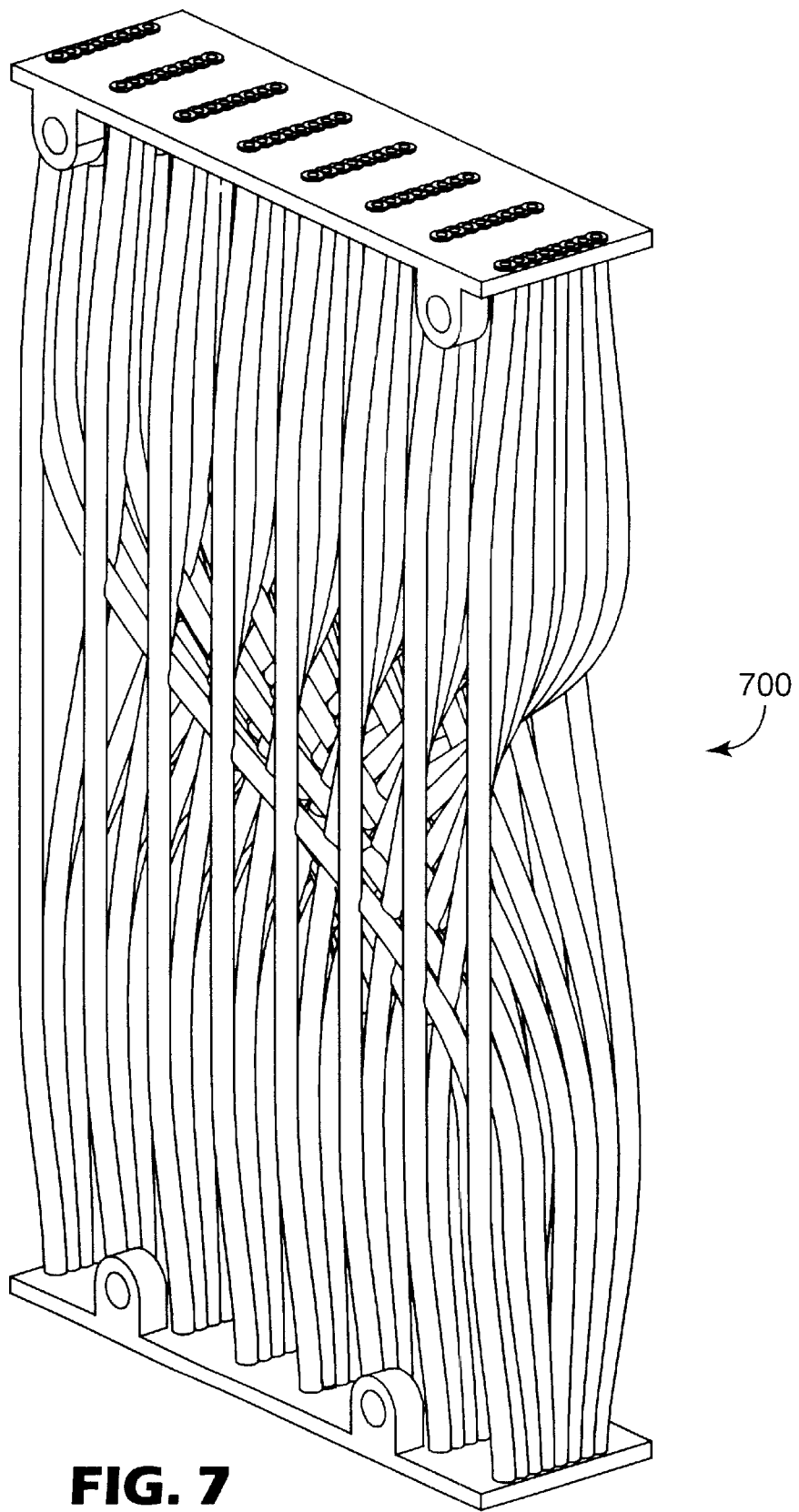
FIG. 7 is a perspective view of an optical manifold in accordance with yet another embodiment of the present invention, further incorporating an input endplate, an output endplate and mounting brackets.

Referring now to FIGS. 7–11, and in particular to FIG. 7, a perspective view of an imperfect shuffle featuring an input endplate and an output endplate as well as openings for screws or other mounting hardware is shown. Note that in this particular optical manifold 700 embodiment the input rows are numbered 1–8 from the bottom to the top and the input columns are numbered 1–8 from left to right. As described earlier, the individual fibers of this imperfect shuffle are rearranged in a stepwise fashion. The formula for this shuffle is for row N move the fiber N−1 columns over. Thus, the fibers in row 1, columns 1–8 correlate to output row 1, columns 1–8 without any movement. The individual fibers of input row 2, columns 1–8 correspond to output row 2 with columns shuffled one step in which the input of column 1 corresponds to the output of column 2, the input of column 2 corresponds to the output of column 3 and so forth with the input of column 8 corresponding to the output of column 1. Likewise, in row 3, the input of column 1 corresponds to the output of column 3, the input of column 2 corresponds to the output of column 4, and so forth, until the input of column 8 corresponds to the output of column 2. This progression is carried on through row 8, in which column 1 corresponds to output column 8, input column 2 corresponds to output column 1 and so forth with input column 8 corresponding to output column 7.

Figure 8:
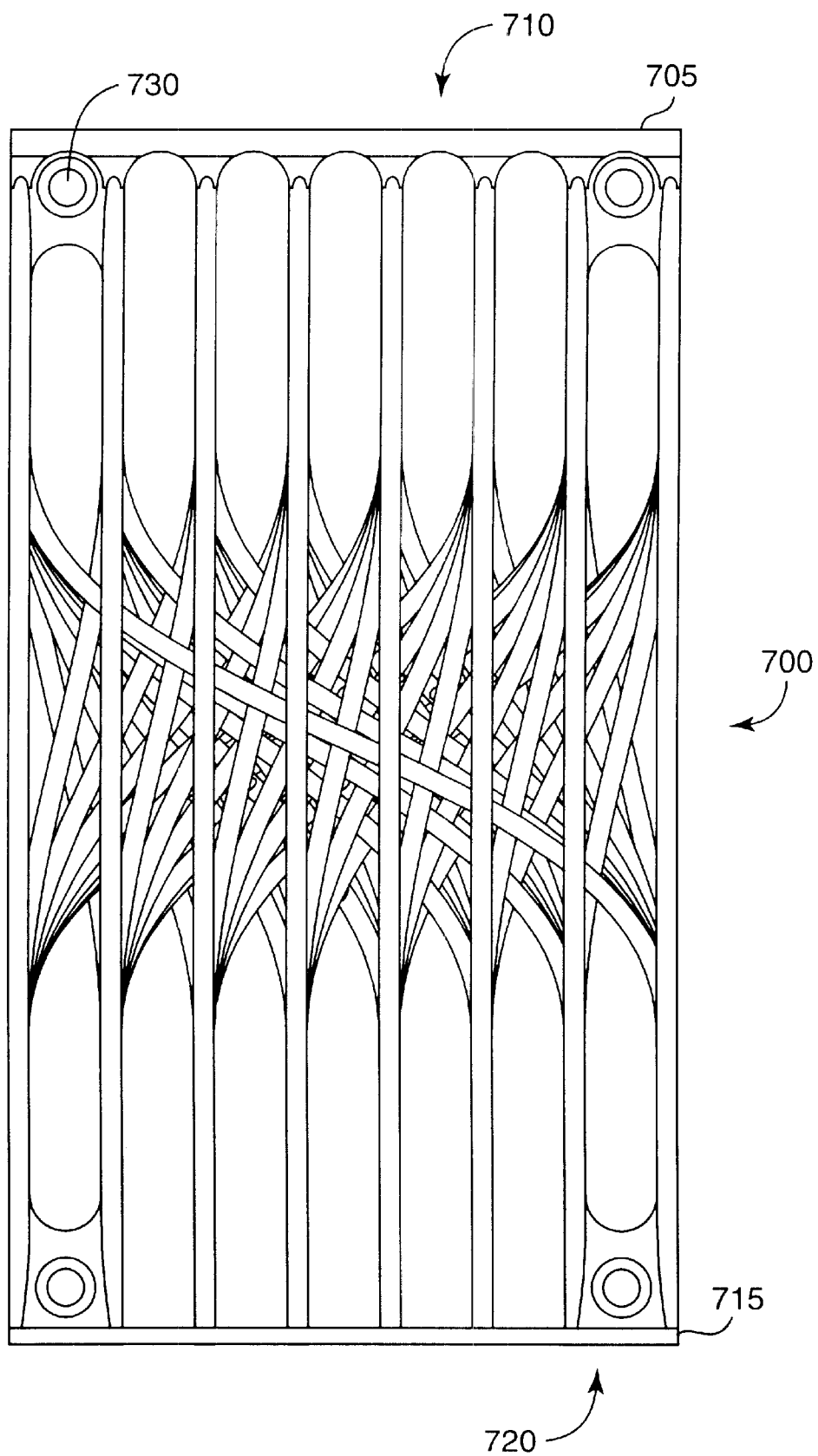
FIG. 8 is a bottom view of the optical manifold in accordance with the embodiment of FIG. 7 and clearly showing the four mounting holes located near the corners of the manifold.

Referring now to FIG. 8, a bottom view of the optical fiber manifold 700 of FIG. 7 is shown. From this view it is possible to observe how the 64 individual fiber tubes are arranged to ensure that the fibers do not go beneath the minimum bend radius and that, because they are enclosed in individual tubes, the individual fibers may be very densely overlapped without worry of entanglement. Additionally, this figure shows the input endplate 705, the output endplate 715 and the holes 730 extending through the entire depth of the object for screws or other mounting hardware. It should be noted that the manifold 700 may be mounted in any number of systems or configurations, as well as attached to a removable card, much like a printed circuit board, as known in the art. Additionally, although this manifold 700 is shown without any sort of connectors or terminations at the input 710 or output 720 end, it is to be understood that multifiber attachments or individual fiber connections or terminations may be used at the input and output ends of the manifold 700, much like those illustrated in FIGS. 4 and 6.

Figure 9:
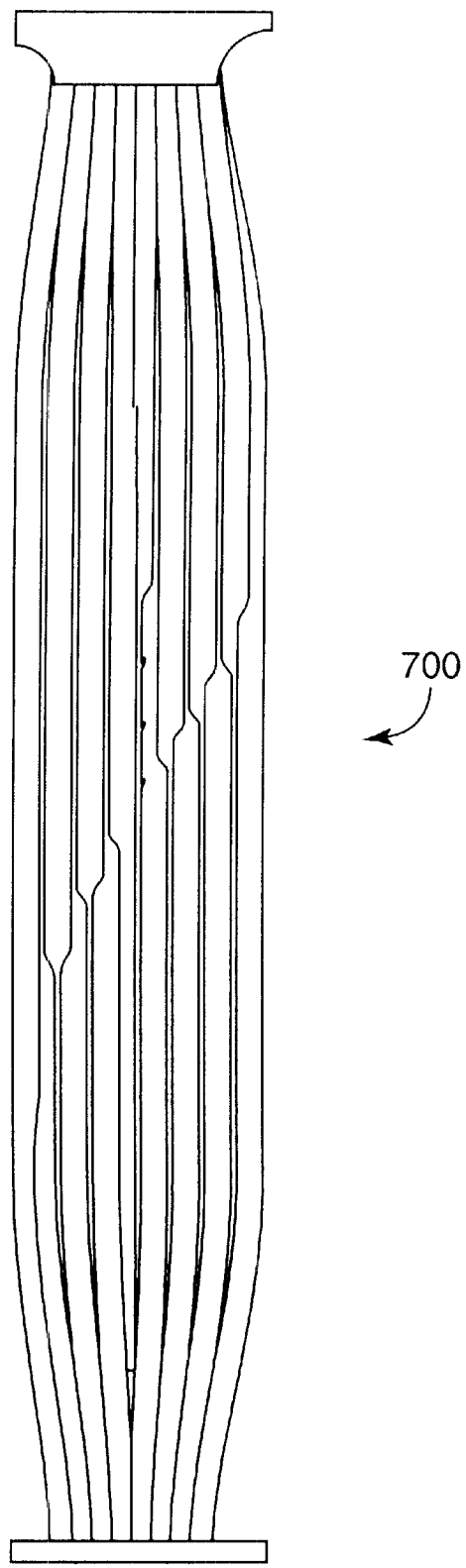
FIG. 9 is a side elevational view of the optical manifold in accordance with the embodiment of FIG. 7 featuring integral endplates at both input and output ends.

Referring now to FIG. 9, a side elevational view of the manifold of FIG. 7 is shown. This figure best illustrates the stacked vertical arrangement of each of the layers of individual tubes, channels or passageways that make up the manifold 700. As a result of the rapid prototyping techniques used, it is possible to achieve an incredibly compact and efficient design without fear of fiber entanglement or significant optical signal loss. Rapid prototyping also allows adjacent passageways or tubes to share a common sidewall. Accordingly, a manifold 700 produced in accordance with the present invention will be far more compact than a collection of preformed tubes that have been brought together to form a manifold.

Figure 10:
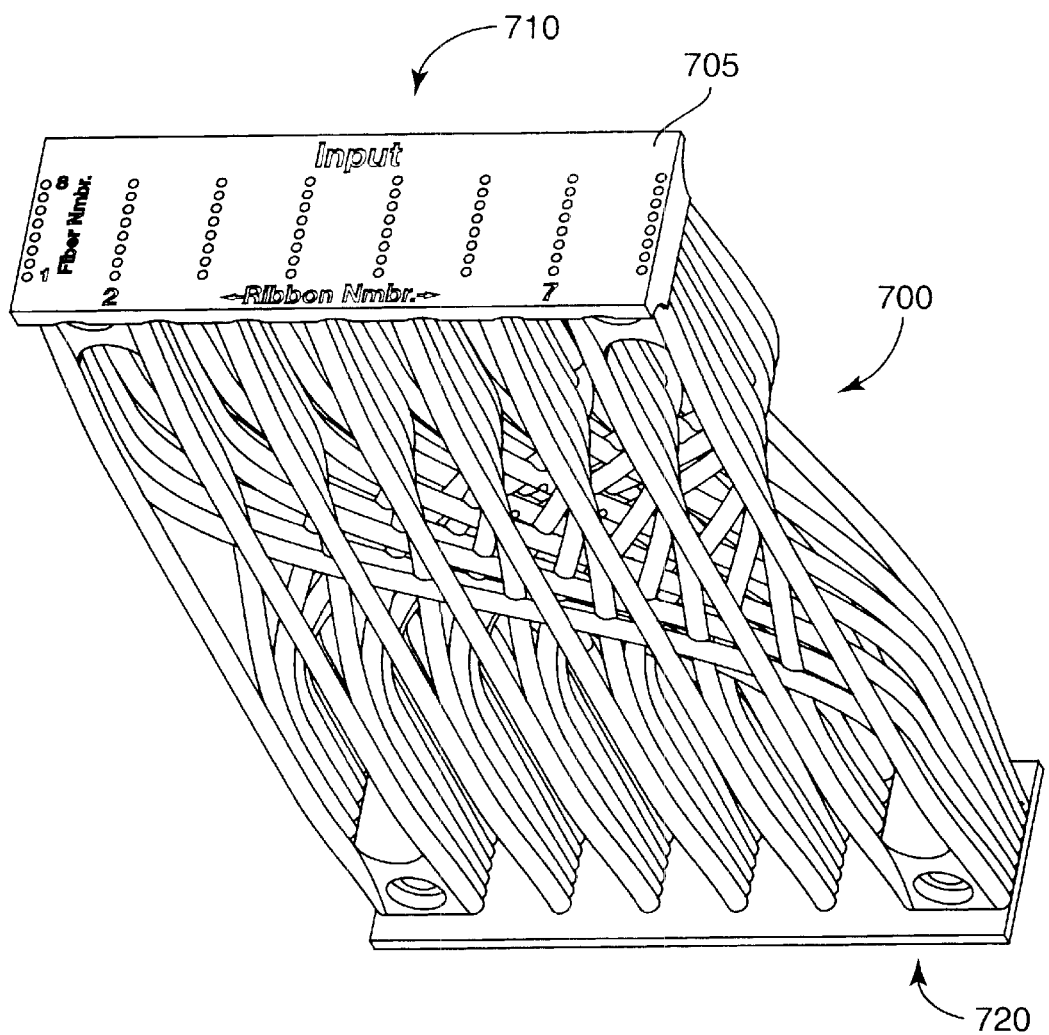
FIG. 10 is a detailed perspective view of the optical manifold in accordance with the embodiment of FIG. 7, featuring the input endplate and the ribbon and fiber numbering system.

Referring now to FIG. 10, an enlarged perspective view of the manifold of FIG. 7 is shown. Here, the input end 710 of the manifold 700 is clearly illustrated indicating markings for a user to identify the ribbon or cable numbers from 1 to 8 and the individual fibers that make up those cables, again from 1 to 8 at the input end. Of course, the rows and columns of the manifold may be labeled or color-coded in almost any manner which facilitates proper identification.

Figure 11:
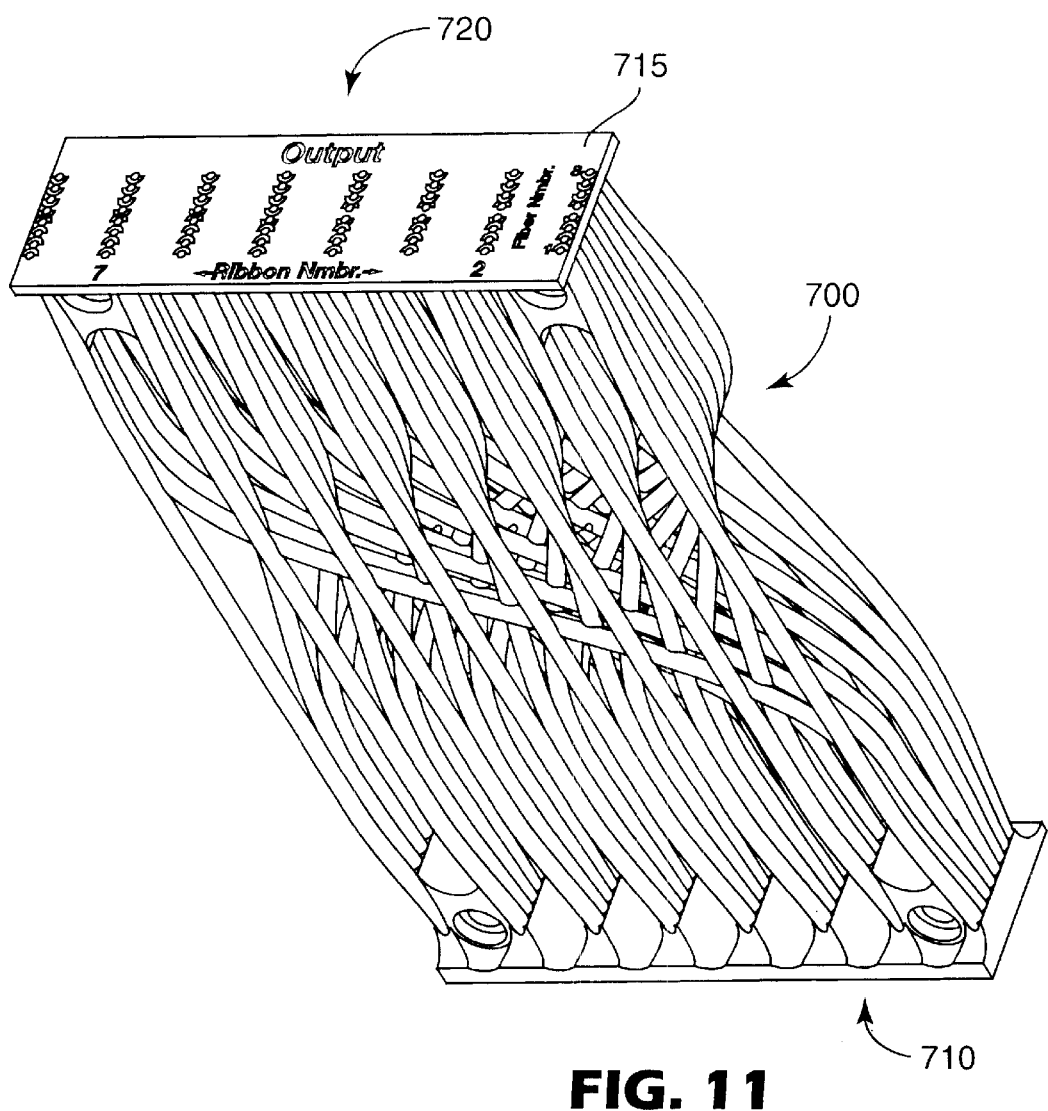
FIG. 11 is a detailed perspective view of the optical manifold in accordance with the embodiment of FIG. 7, featuring the output endplate and the ribbon and fiber numbering system.

Referring now to FIG. 11, another enlarged perspective drawing of the manifold embodiment shown in FIG. 7. This particular figure best illustrates the output end 720 of the manifold 700 again featuring a numbering guide for users illustrating the ribbon or cable numbers from 8 to 1 and the fiber numbers ranging from 1 to 8. It is believed that one of the unique benefits of the present invention is that it facilitates a shuffle of any number of mathematical arrangements in a nearly error proof manner by merely feeding the properly numbered or color-coded fiber of each input cable and then collecting the fibers into the appropriate output cables at the opposite end of the manifold. In short, as long as the appropriate fibers are fed into the proper input holes, they must emerge at the appropriate output holes of the manifold and be collected into the appropriate multifiber cables or bundles.

Figure 12:
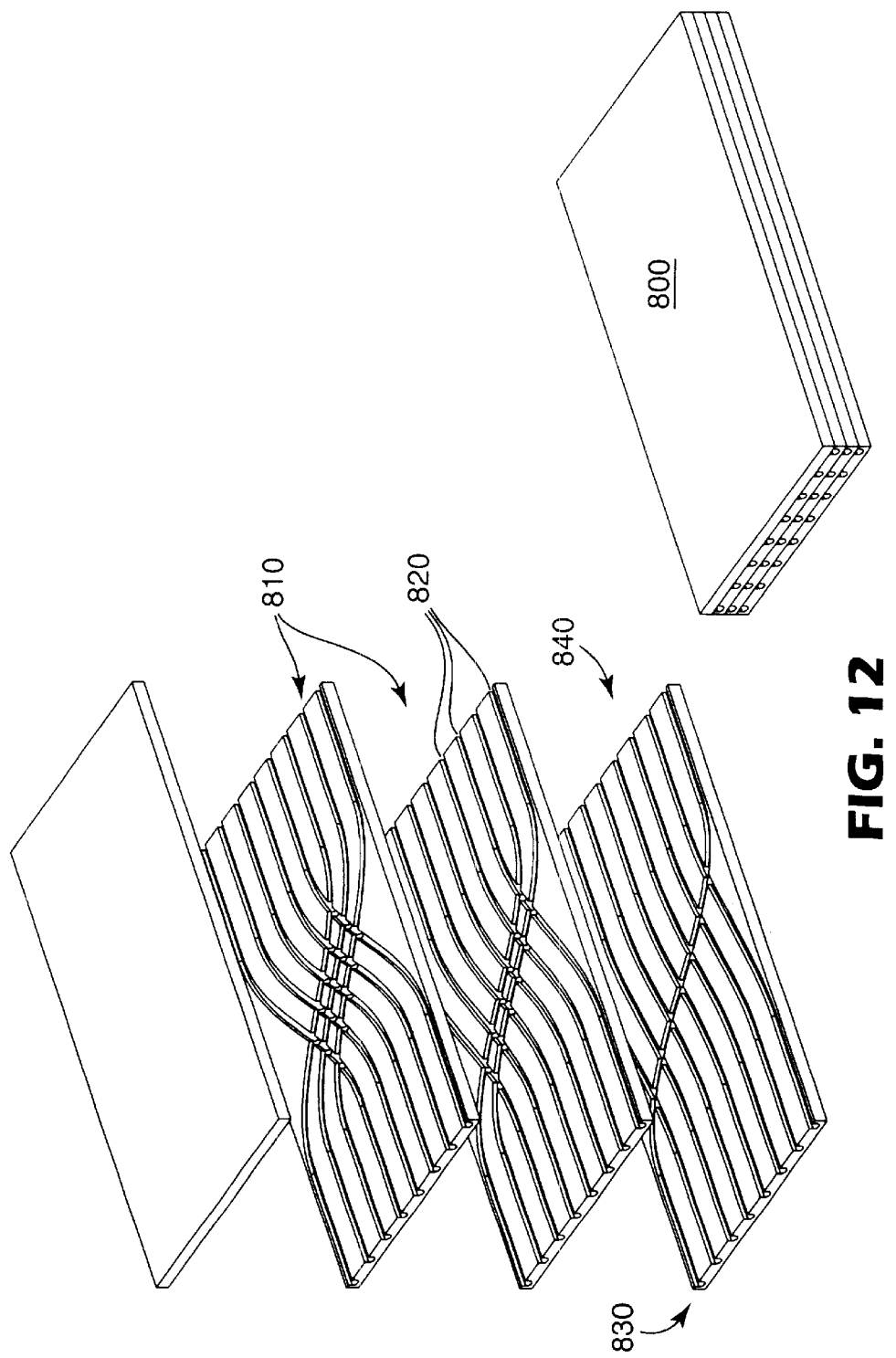
FIG. 12 is an exploded perspective view an optical manifold constructed in accordance with the present invention by stacking a series of plates having inscribed grooves or channels.

Referring now to FIG. 12, another alternative embodiment constructed in accordance with the present invention is shown. The body of an optical manifold 800 may be constructed by building up a series of stacked plates 810. Each of these plates 810 will have a number of grooves or channels 820 extending completely across its length from the input end 830 to the output end 840 of the plate 810. As the plates 810 are indexed to align the edges and stacked to form an optical manifold 800, the channels 820 in each plate 810 act as passageways connecting input openings at one end of the manifold 800 with output openings at the opposite end of the manifold. Of course, these plates may be manufactured by a number of different techniques including, but not limited to, milling channels into a solid plate, molding the plate with channels on a surface, or building the plate up in a layer additive process such as those described hereinabove.

Figure 13:
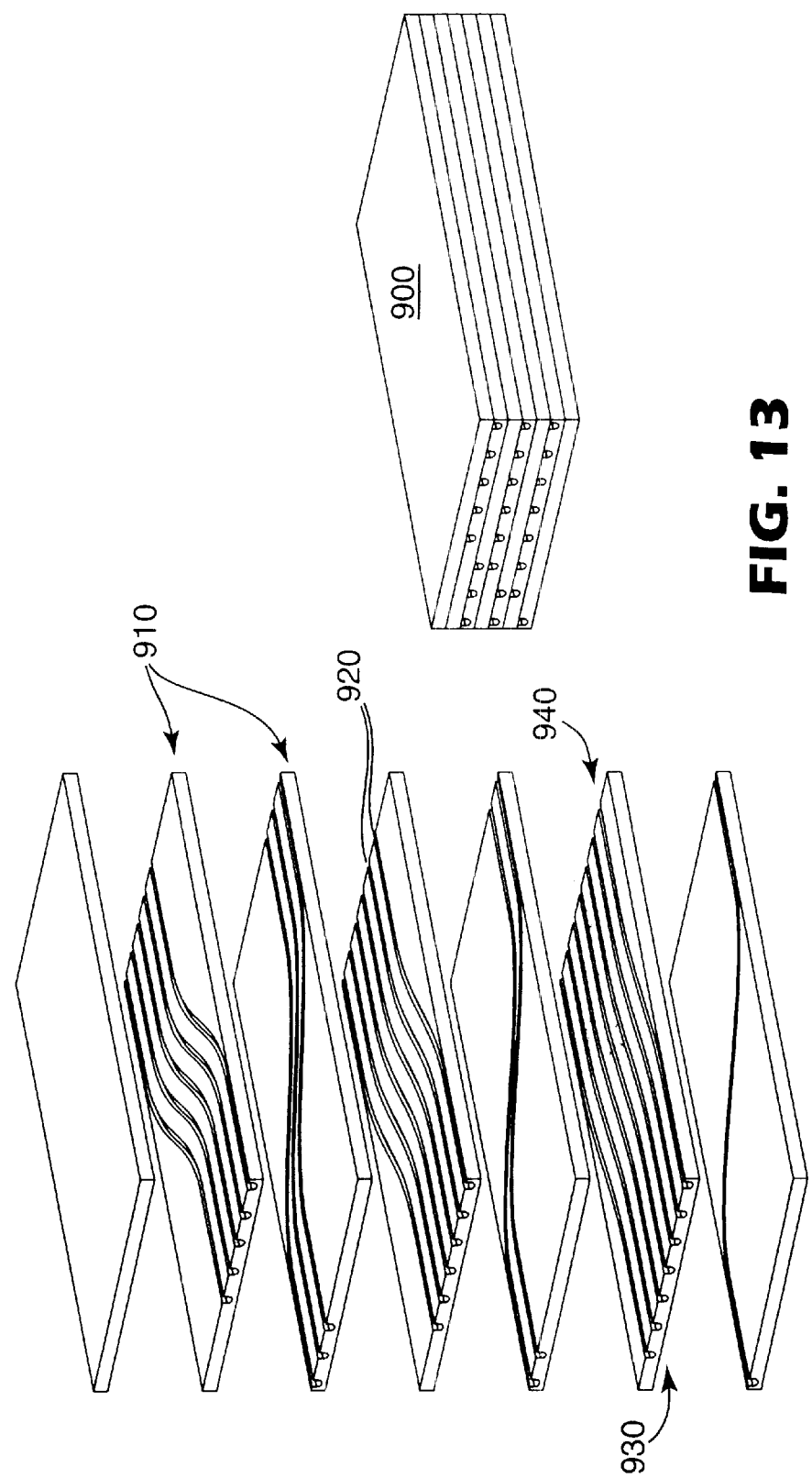
FIG. 13 is an exploded perspective view an alternative embodiment optical manifold to that shown in FIG. 12 constructed by stacking a series of plates having inscribed grooves or channels.

Referring now to FIG. 13, an alternative embodiment of the optical manifold set forth and described in regard to FIG. 12 is shown. As in the embodiment of FIG. 12, the body of an optical manifold 900 may be constructed by building up a series of stacked plates 910 in which each of these plates has a number of grooves or channels 920 extending completely across its length from the input end 930 to the output end 940 of the plate 910. However, in this particular embodiment, the channels or grooves 920 are arranged on each plate to avoid any intersections. This may be done to prevent fibers from coming in direct contact with each other or being possibly misdirected into the wrong channel 920 while passing from the input end 930 to the output end 940 of the manifold 900. As shown here, a manifold constructed in this manner will require at least twice the number of grooved plates 910 to facilitate the same optical circuit constructed from plates which allow the channels to intersect and the fibers to touch. This also results in a stacked plate manifold which is much taller or larger in the z-direction than the embodiment depicted in FIG. 12.

Figure 14:
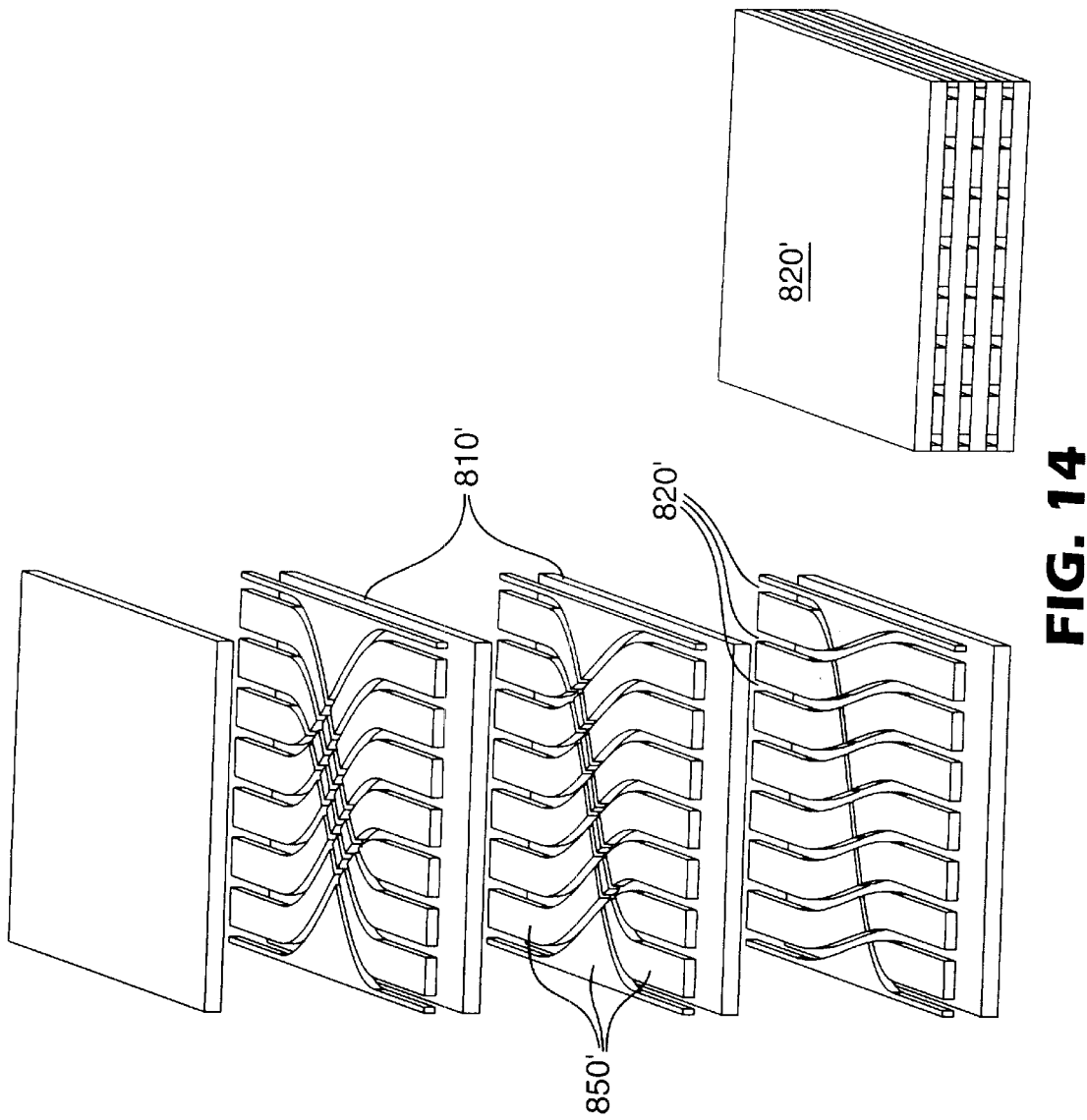
FIG. 14 is an exploded perspective view an optical manifold constructed in accordance with the present invention by stacking a series of plates having a plurality of fiber guide pieces affixed to a surface to form grooves or channels.
Figure 15:
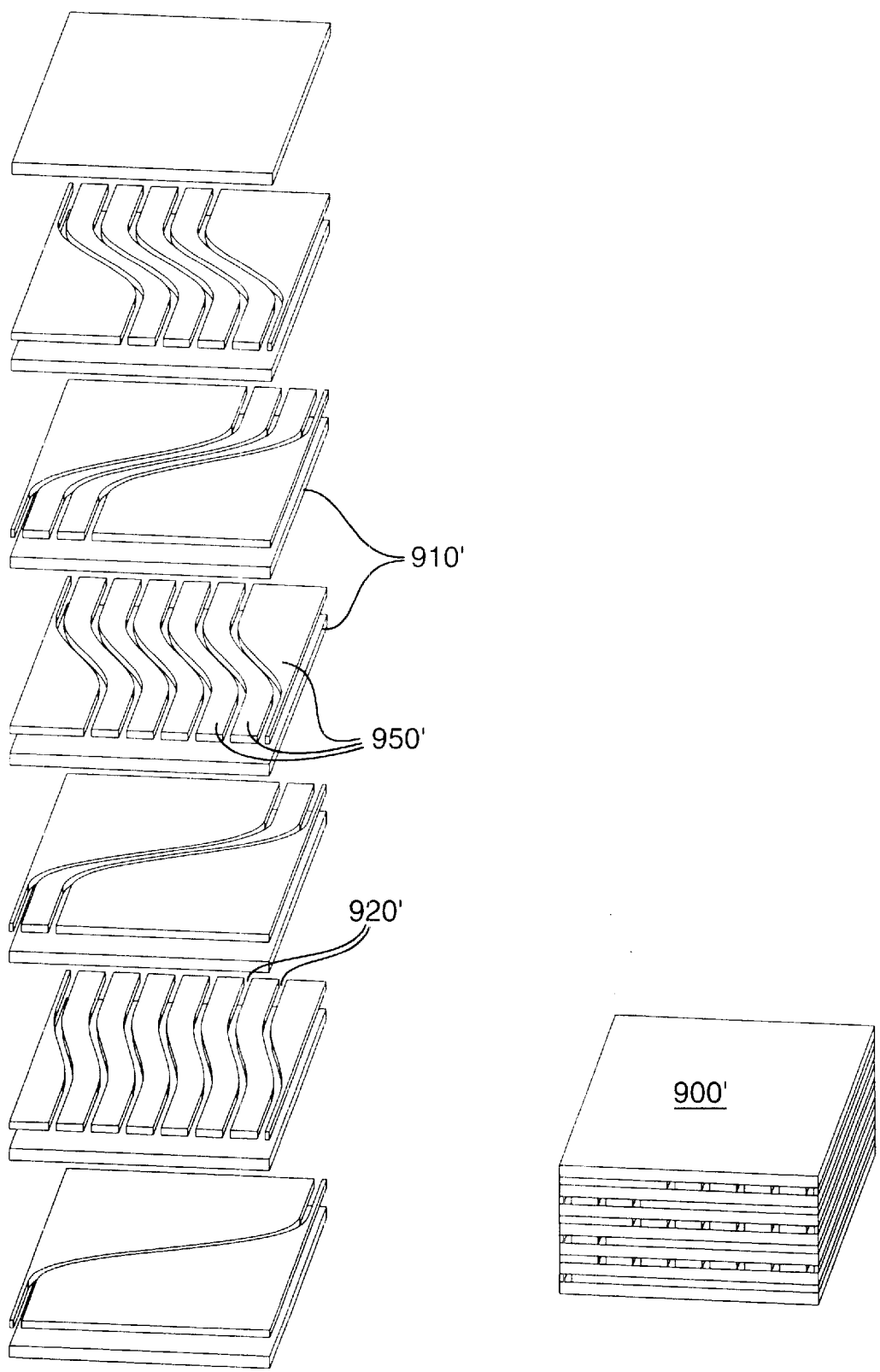
FIG. 15 is an exploded perspective view an alternative embodiment optical manifold to that shown in FIG. 14 constructed by stacking a series of plates having a plurality of fiber guide pieces affixed to a surface to form grooves or channels.

Referring now to FIGS. 14 and 15, a manufacturing variation of the stacked plate manifolds shown in FIGS. 12 and 13, respectively, is shown. The manifold embodiments 800', 900' as shown in FIGS. 14 and 15 are again created by stacking plates 810', 910' one on top of another and indexing them to form a manifold. However, the embodiments of FIGS. 14 and 15 do not have channels or grooves 820', 920' which are milled, cut or molded into the plates, but rather a large number of individual guide pieces 850', 950' which are glued, affixed or attached in some manner to a particular plate 810', 910' to create a pattern thereon. As one skilled in the art will recognize, the labor or manufacturing steps required to produce a large number of guide pieces, attach them to their respective plates, and then stack the plates one on top of another to form a manifold would be considerable, particularly in comparison to plates formed by milling, injection molding, or other production techniques. FIGS. 14 and 15 are provided to show yet another approach to creating a stacked plate manifold as depicted in FIGS. 12 and 13.

Figure 16:
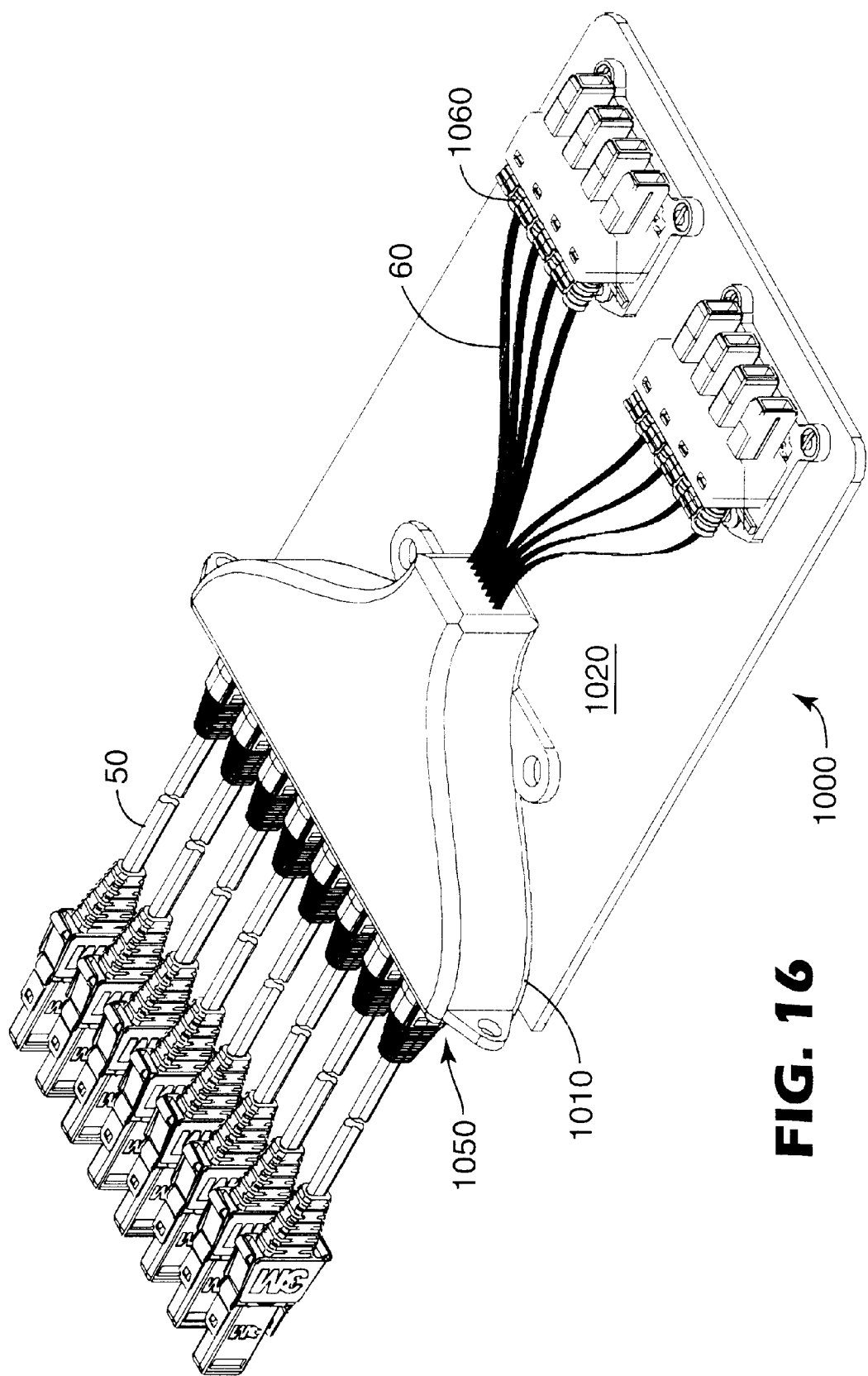
FIG. 16 is a perspective view of a three dimensional optical circuit constructed in accordance with the present invention in which the optical manifold has been enclosed within a protective housing and mounted on a plug-in card.

Referring now to FIG. 16, a perspective view of an optical manifold that has been enclosed within a protective housing 1010 and mounted on a plug-in card 1020 is shown. This embodiment may also be referred to as a plug-in optical shuffle module 1000. As shown here, ruggedized and ribbonized optical cables 50 are directed to multifiber attachments 1050 and the unterminated fiber ends are inputted to an optical shuffle in accordance with the present invention. The optical manifold is enclosed within a protective housing 1010 of molded polymer, formed sheet metal embedded in epoxy or the like. Following the shuffle, the individual fibers are again gathered into ribbonized bundles 60 and directed to blind-mate, plug-in or other optical card connectors 1060. These connectors 1060 serve as terminations that are adapted to allow fiber connections at the edge of the plug-in card 1020 and allow the optical shuffle to be implemented in a fully modular quick-connect design.

Figure 17:
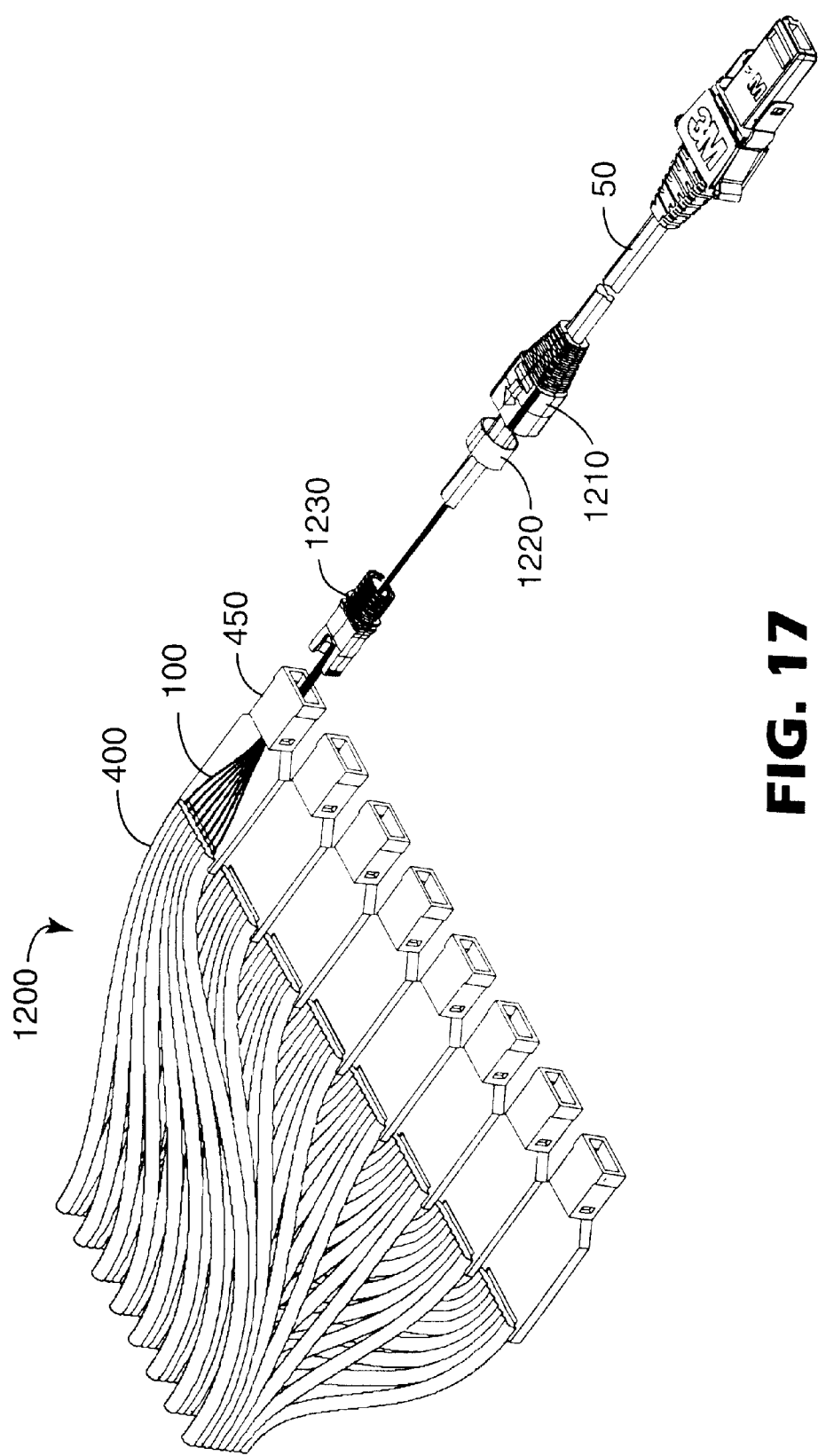
FIG. 17 is an exploded perspective view of a three dimensional optical circuit constructed in accordance with the present invention in which a ruggedized optical cable is coupled to a ruggedized cable attachment on the optical manifold.

Referring now to FIG. 17, a three dimensional optical circuit 1200 with an exploded detail view of a single ruggedized optical fiber cable 50 attached thereto is shown. The three dimensional optical circuit features an optical manifold 400 similar to that set forth and described in regard to FIG. 4. This manifold features eight ruggedized cable attachments 450 at the input end, which are designed to receive a snap fit, crimp barb 1230 to facilitate the transfer of mechanical loads and stresses from the ruggedized exterior of the optical cable 50 through the crimp barb 1230 and into the body of the optical manifold 400 itself. In short, one of the unique and surprising features of an optical circuit utilizing the optical manifold of the present invention is that mechanical loads or stresses may actually be transferred to and carried by the unitary body of the manifold itself. This is quite different from flexible substrate or woven fiber approaches in that the manifold itself can provide stress relief to the fibers which are passing therethrough. It is the inventors' belief that the prior art does not show any sort of apparatus which could both shuffle or organize optical fibers into a circuit while also carrying a mechanical load or providing stress relief to the fibers themselves.

As shown here, a ruggedized cable 50 containing a number of optical fibers 100 is passed through a manifold 400 by first cutting back the ruggedized exterior portion of the cable 50; passing the exposed fibers 100 through a strain relief boot 1210, a crimp ring 1220 and a crimp barb 1230; crimping the crimp ring 1220 to the load bearing ruggedized exterior of the cable 50; fitting the crimp ring 1220 within the crimp barb 1230 to transfer mechanical stresses from the ruggedized cable 50 to the barb 1230; and finally connecting the barb 1230 to the ruggedized attachment 450 of the manifold 400 to transfer stresses from the cable 50 to the crimp ring 1220 to the crimp barb 1230 to the manifold itself 400. As the optical fibers 100 of the ruggedized cable 50 are passed through the ruggedized attachment 450, they may be spread using a pitch tool or the like to ensure proper alignment with the manifold 400. Finally, the optical fibers 100 are guided and inserted into the appropriate input openings 410 of the optical manifold 400 to create a three dimensional optical circuit.

Figure 18:
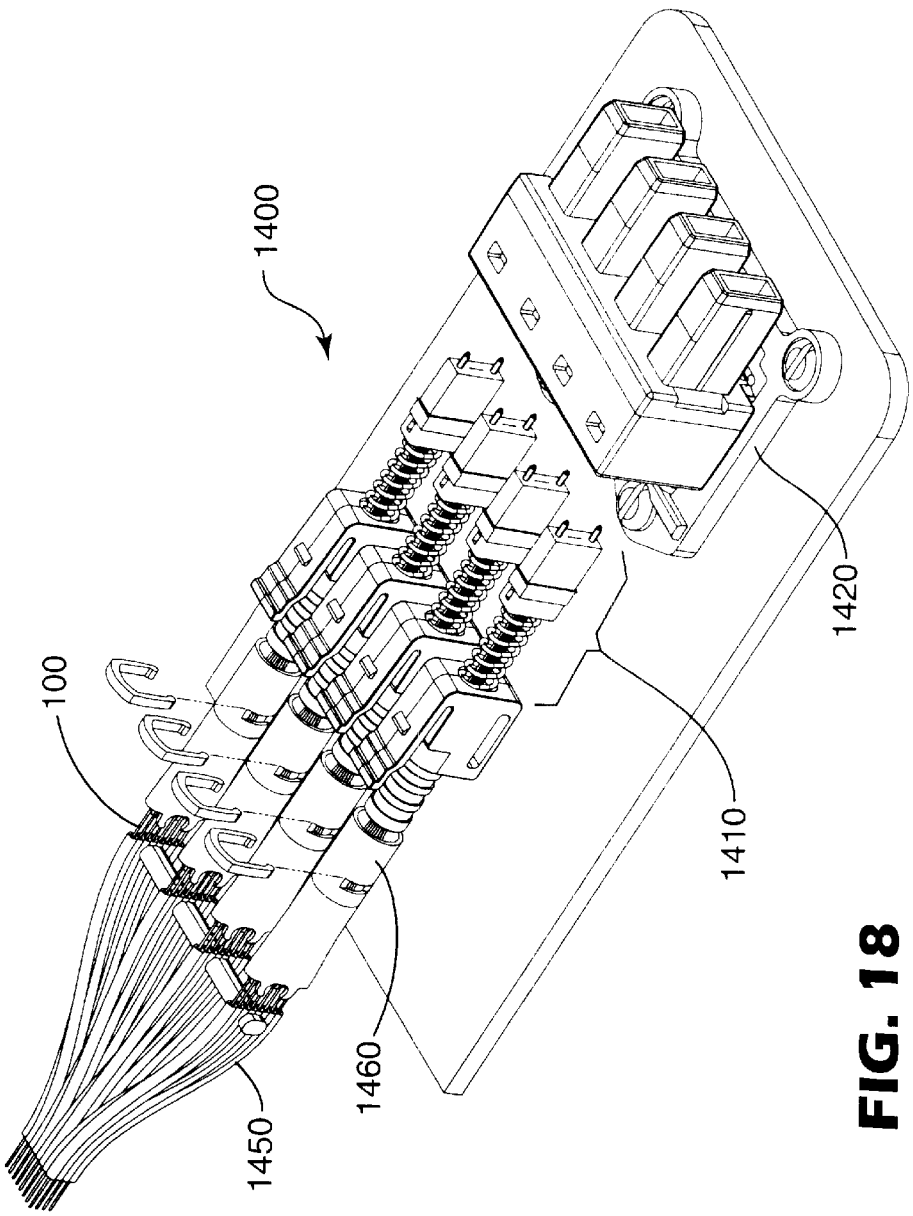
FIG. 18 is an exploded perspective view of a three dimensional optical circuit constructed in accordance with the present invention and illustrating a shuffling connector with ferrule spring, push-pin connectors.

Referring now to FIG. 18, a three dimensional optical circuit constructed for use as a shuffling connector 1400 with ferrule spring, push-pin connectors 1410 is shown. As shown here, a particularly small optical shuffle 1450 may be used to arrange optical fibers 100 into a three dimensional circuit and output the fibers to shuffle adapters 1460 which gather individual fibers 100 back together into bundles or ribbonized form. The ribbonized fiber bundles 60 may then be terminated in a ferrule spring, push-pin type connector 1410 for use with a blind mate card connector 1420, as shown. It is possible to envision a particularly small shuffling connector 1400 such as this fitting within various environments including enclosures for electronics as a sort of optical plug-in card or module. This small, highly efficient modular design is quite different from the significantly greater amounts of surface space required to create optical circuits including shuffles using prior art flexible substrate techniques and optical fiber splices to attach the appropriate connectors.

Figure 19:
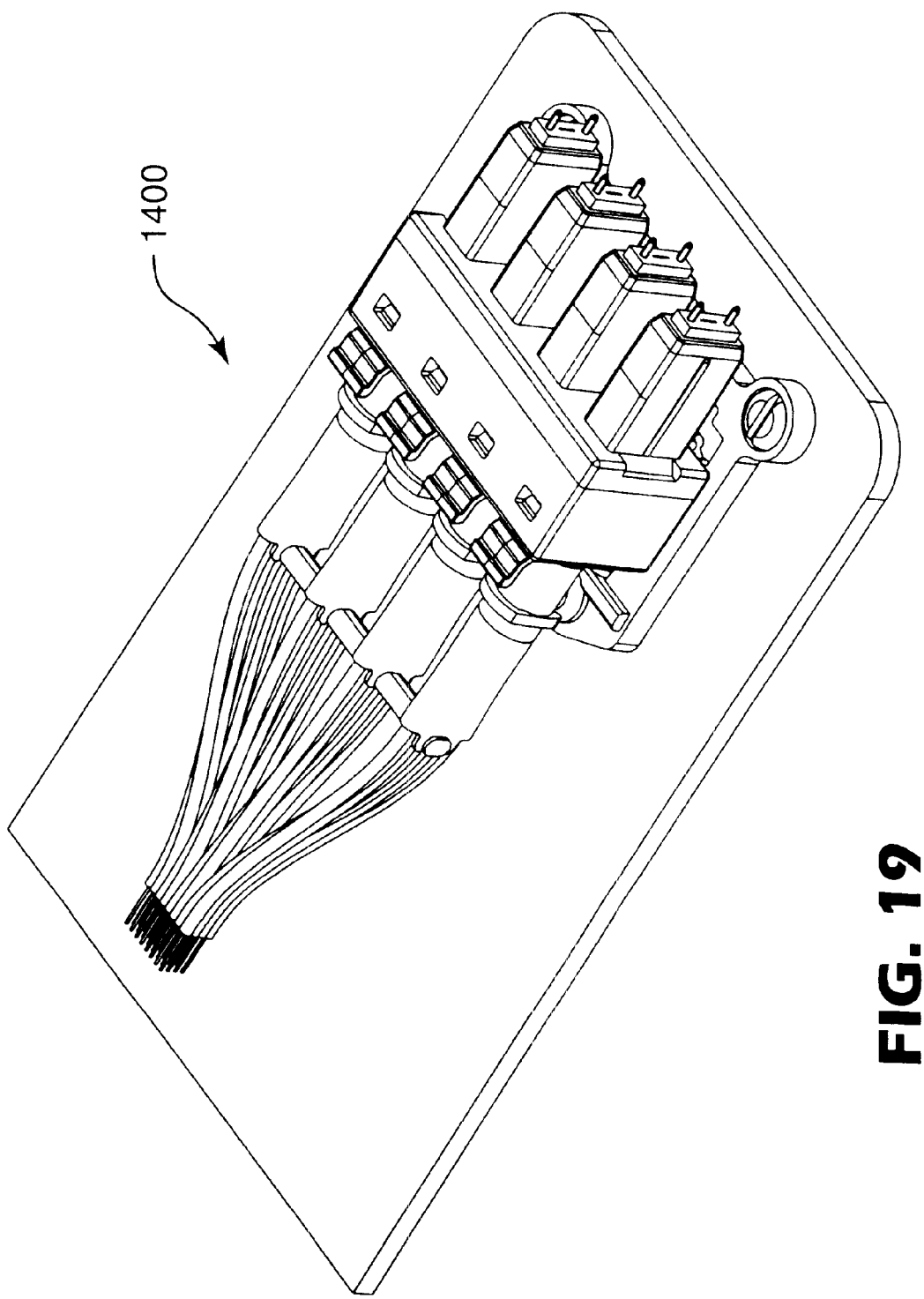
FIG. 19 is an assembled perspective view of the three dimension optical circuit shown in FIG. 18 and illustrating a shuffling connector with ferrule spring, push-pin connetors.

As best seen in FIG. 19, an assembled shuffling connector 1400 may be quite compact in design. This entire modular component may be less than 2.0 inches in both length and width, and less than 1.0 inch in height. For comparison purposes, a flexible substrate optical circuit configured to carry out a similar function, may require 12.0 inches or more in both the length and width directions, and while being thinner in the z-direction, it is difficult to allow for such large surface areas within the densely packed environment of an electronic enclosure.

Figure 20:
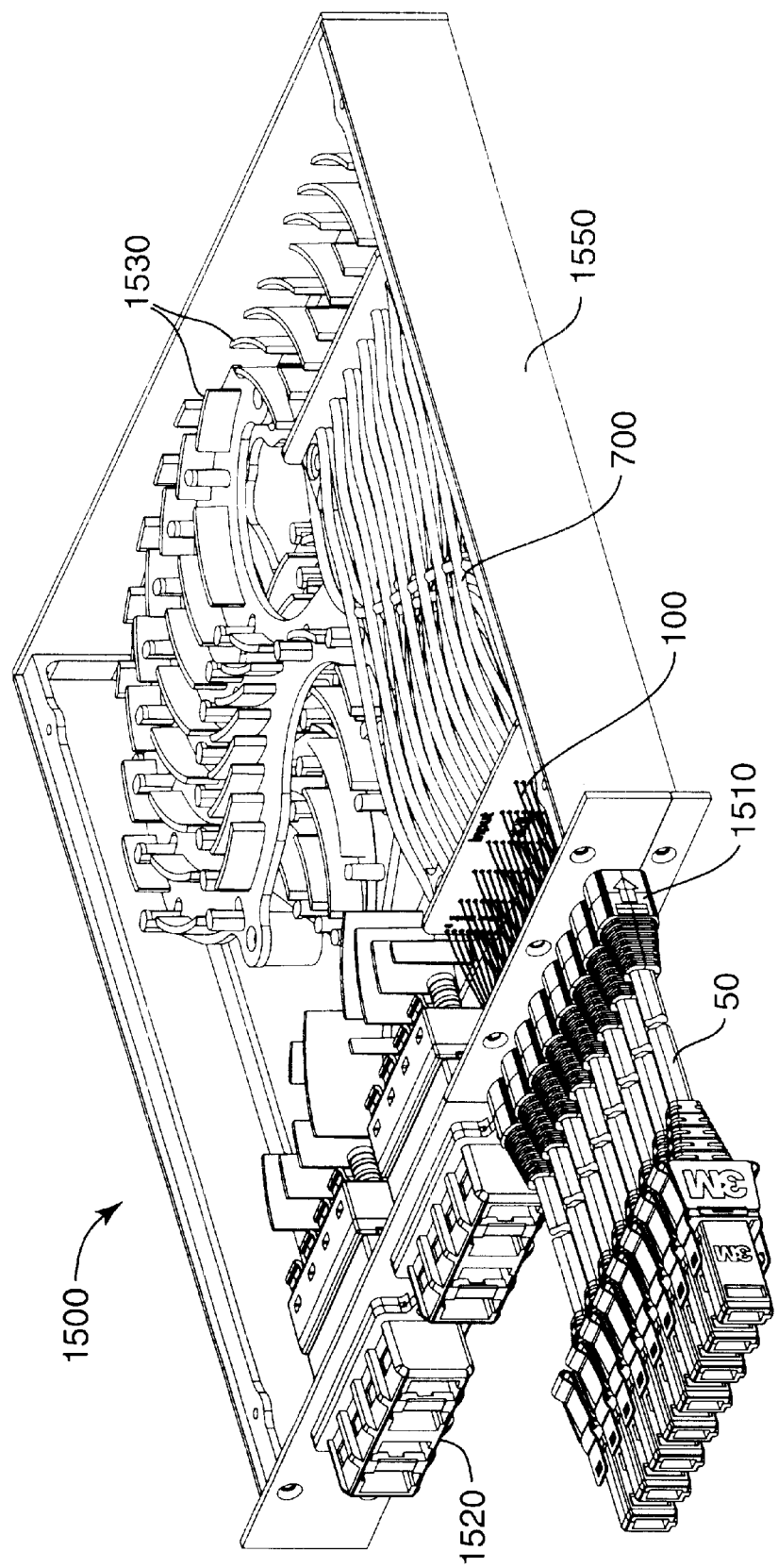
FIG. 20 is a perspective view of a three dimensional optical circuit constructed in accordance with the present invention and illustrating an integrated shuffle module with ruggedized fiber inputs, bulkhead connector outputs, and an enclosure suitable for rack mounting.

Referring now to FIG. 20, a perspective view of a three dimensional optical circuit illustrating an integrated shuffle module 1500 having ruggedized fiber inputs 1510, bulkhead connector outputs 1520, and a housing 1550 suitable for rack mounting is shown. The modular design shown here, features a durable housing 1550 suitable for rack mounting within an electronic enclosure. This particular three dimensional optical circuit features an optical manifold 700 of the embodiment shown and described in regard to FIGS. 7–11. It further includes fiber routing features or fins 1530 for guiding the optical fibers through a safe bend radius within the housing 1550 and toward the optical terminations and bulkhead connectors 1520 provided at the output of the module 1500. It should also be noted that at the input of this module 1500 there are provided ruggedized cable attachments 1510 adapted to receive fibers from ruggedized cables 50, of nearly any length, and for efficiently transmitting mechanical loads and stresses from the ruggedized cables 50 into the body of the housing itself to again provide stress relief for the optical fibers. Although this modular design features one particular form of optical manifold, one skilled in the art will appreciate that virtually any optical manifold, and particularly those created in accordance with the unitary body, rapid prototyping optical manifold embodiments of the present invention.

Although preferred embodiments of the invention have been described in the examples and foregoing description, it will be understood that the invention is not limited to the embodiments disclosed, but is capable of numerous rearrangements and modifications of the parts and elements without departing from the spirit of the invention, as defined in the following claims. Therefore, the spirit and the scope of the appended claims should not be limited to the description of the preferred embodiments contained herein.

What is claimed is:

1. A three dimensional optical circuit comprising:
 a plurality of optical fibers;
 an optical manifold comprising:
  a unitary body having an input end and an output end;
  said input end having a plurality of input openings in a first ordered arrangement;
  said output end having a plurality of output openings in a second ordered arrangement which differs from that of said first ordered arrangement;
  said unitary body further comprising a plurality of integrally formed passageways, each of said passageways connecting a single input opening with a single output opening; and
  wherein each of said plurality of optical fibers is disposed within one of said passageways of the optical manifold.

2. The three dimensional optical circuit of claim 1, wherein the unitary body is formed of a polymeric material.

3. The three dimensional optical circuit of claim 1, wherein the unitary body is formed by an additive manufacturing process.

4. The three dimensional optical circuit of claim 1, wherein the optical fibers slide freely within the passageways of the optical manifold.

5. The three dimensional optical circuit of claim 1, wherein the optical fibers are fixed in place within the passageways of the optical manifold.

6. The three dimensional optical circuit of claim 5, wherein the passageways of the optical manifold have been filled with an adhesive resin.

7. The three dimensional optical circuit of claim 6, wherein the optical manifold is formed of a material which is significantly more soluble than the adhesive resin.

8. The three dimensional optical circuit of claim 5, wherein the passageways of the optical manifold contain at least one lateral opening disposed between the input end and the output end of the manifold.

9. The three dimensional optical circuit of claim 1, wherein the optical manifold has been enclosed within a protective housing.

10. The three dimensional optical circuit of claim 10, wherein at least one optical connector is anchored to the protective housing.

11. The three dimensional optical circuit of claim 1, wherein the optical manifold has been mounted to a plug-in card to form an optical shuffle module.

12. A three dimensional optical module comprising:
 a housing;
 at least one ruggedized cable attachment disposed on the exterior of said housing;

at least one bulkhead connector disposed on the exterior of said housing;

an optical manifold disposed within said housing, said optical manifold comprising:

a unitary body having an input end and an output end;

said input end having a plurality of input openings in a first ordered arrangement;

said output end having a plurality of output openings in a second ordered arrangement which differs from that of said first ordered arrangement;

said unitary body further comprising a plurality of integrally formed passageways, each of said passageways connecting a single input opening with a single output opening; and a plurality of optical fibers, said plurality of optical fibers entering the housing via the at least one ruggedized cable attachment, passing through the optical manifold, and terminating at the at least one bulkhead connector.

13. The three dimensional optical circuit of claim 12, wherein the at least one bulkhead connector further comprises a plurality of ferrule spring, push-pin connectors.

14. The three dimensional optical module of claim 12, wherein the at least one ruggedized cable attachment and the at least one bulkhead connector are disposed on a single surface of the exterior of the housing.

15. The three dimensional optical module of claim 12, wherein the housing further comprises holes to facilitate rack mounting.

* * * * *